US006269292B1

(12) United States Patent
Kokubu et al.

(10) Patent No.: US 6,269,292 B1
(45) Date of Patent: Jul. 31, 2001

(54) DATA CARRIER SYSTEM

(75) Inventors: Sadao Kokubu; Hisashi Aoki; Takashi Mizuno; Shinichi Koga, all of Aichi-ken (JP)

(73) Assignee: Kabushiki Kaisha Tokai-Rika-Denki Seisakusho (JP)

( * ) Notice: Subject to any disclaimer, the term of this patent is extended or adjusted under 35 U.S.C. 154(b) by 0 days.

(21) Appl. No.: 09/331,084

(22) PCT Filed: Dec. 10, 1997

(86) PCT No.: PCT/JP97/04545

§ 371 Date: Jun. 11, 1999

§ 102(e) Date: Jun. 11, 1999

(87) PCT Pub. No.: WO98/26374

PCT Pub. Date: Jun. 18, 1998

(30) Foreign Application Priority Data

Dec. 11, 1996 (JP) .................................................... 8-331094

(51) Int. Cl.7 ........................................................ G06F 7/00

(52) U.S. Cl. ................................ 701/35; 701/32; 701/29; 340/825.72; 340/5.23; 340/5.22; 235/375; 235/380

(58) Field of Search ................................ 701/35, 29, 32; 235/380, 382.5, 382, 379, 375, 384; 340/825.31, 825.34, 825.54, 825.72, 425.5, 426, 505; 307/9.1, 10.2, 10.5

(56) References Cited

U.S. PATENT DOCUMENTS

| | | | | |
|---|---|---|---|---|
| 4,886,616 | | 9/1989 | Takeuchi et al. | 364/424.04 |
| 5,635,900 | * | 6/1997 | Hasegawa et al. | 340/426 |
| 5,739,674 | * | 4/1998 | Kawahara et al. | 320/48 |
| 5,774,043 | * | 6/1998 | Mizuno et al. | 340/426 |
| 5,801,614 | * | 9/1998 | Kokubu | 340/425.5 |
| 5,861,816 | * | 1/1999 | Funakoshi et al. | 340/825.31 |
| 5,912,512 | * | 6/1999 | Hayashi et al. | 307/10.5 |

FOREIGN PATENT DOCUMENTS

| | | |
|---|---|---|
| 91 03 374 | 3/1991 | (DE) . |
| 195 27 488 A1 | 2/1996 | (DE) . |
| 60-51988 | 3/1985 | (JP) . |
| 60-148653 | 5/1985 | (JP) . |
| 63-199369 | 12/1988 | (JP) . |
| 6-44425 | 7/1992 | (JP) . |
| 7-85329 | 6/1999 | (JP) . |

* cited by examiner

*Primary Examiner*—William A. Cuchlinski, Jr.
*Assistant Examiner*—Yonel Beaulieu
(74) *Attorney, Agent, or Firm*—Todd Deveau; Roger S. Williams; Troutman Sanders LLP

(57) ABSTRACT

A data carrier system is comprised of a vehicle-side controller 12 mounted at a vehicle 11, keys 19A and 19B, and an R/W device 31 installed in an office 29. A transponder 20 is built into each of the keys 19A and 19B. In this structure, after operational data has been transmitted from the vehicle-side controller 12 and written in a nonvolatile memory of the transponder 20, when the keys 19A and 19B are inserted in the R/W device 31 by a vehicle driver, the R/W device 31 reads the operational data from the transponder 20 and gives the same to a personal computer 30. Accordingly, an inconvenience of the vehicle driver carrying an IC card for recording operational data is removed.

10 Claims, 21 Drawing Sheets

(PRIOR ART)

DATA CARRIER SYSTEM

FIELD OF THE INVENTION

The present invention relates to a data carrier system in which operational information of a vehicle is provided from a vehicle-side control device to an external control device.

BACKGROUND ART

Prior Art

FIG. 22 shows a conventional structure of the above-described data carrier system. A vehicle 1 is equipped with a vehicle-side control device 2. When an IC card 3 is inserted in a holder (not shown) of the vehicle 1, operational information (the date and time of start-up of an engine, and the like) is transmitted from the vehicle-side control device 2 to the IC card 3 and is also recorded in a memory of the IC card 3.

A personal computer 4 and a reading device 5 are installed in an office or the like. When a driver operates the personal computer 4 after having carried the IC card 3 and inserted it in the reading device 5, a command to "read data" is transmitted from the personal computer 4 to the reading device 5. Then, a command to "transmit data" is transmitted from the reading device 5 to the IC card 3 and the operational information is thereby transferred from the IC card 3 to the personal computer 4 via the reading device 5.

However, in the above-described conventional structure, it is inconvenient for the driver to carry both a key and the IC card 3, and accordingly, there is room for improvement with respect to convenient usage. Particularly, in a case of a special vehicle such as a construction vehicle, it is extremely inconvenient to carry both the key and the IC card 3 in a work site, and accordingly, improvement in convenient usage has been urgently demanded.

The present invention has been devised in view of the above-described circumstances, and an object thereof is to provide a data carrier system which allows communication of operational information without carrying of an IC card.

DISCLOSURE OF THE INVENTION

A data carrier system described in claim 1 is characterized by comprising: a vehicle-side control device mounted at a vehicle, which transmits operational information of the vehicle; a data carrier device which is provided in a vehicle key and which records the operational information transmitted from the vehicle-side control device; and a reading device which reads out the operational information from the data carrier device, accompanying supplying thereto of a command signal from an external control device.

According to the above-described means, communication of the operational information is effected with the vehicle key serving as a medium. For this reason, it becomes unnecessary to carry an IC card, thereby resulting in improved convenience for use.

A data carrier system described in claim 2 is characterized in that the vehicle-side control device permits starting of the vehicle when it is determined that a key is that registered based on key information transmitted from the data carrier device.

According to the above-described means, an existing key having security functions (an immobilizer function, a door security function) can be utilized to allow communication of the operational data.

A data carrier system described in claim 3 is characterized in that the reading device has a read/write function in which user information is supplied to and recorded in the data carrier device and the user information is read from the data carrier device.

According to the above-described means, it is possible to record the user information (maintenance data, optional carrying data, and the like) supplied from the reading device to the data carrier device, or to read and communicate the user information recorded in the data carrier device. For this reason, it becomes unnecessary to carry an IC card or a notebook having the user information recorded therein. Accordingly, convenience for use is further improved.

A data carrier system described in claim 4 is characterized in that the vehicle-side control device, the data carrier device, and the reading device each have an antenna coil; communication between the vehicle-side control device and the data carrier device and communication between the data carrier device and the reading device are each effected via the antenna coil in a non-contacting state; when communication is effected between the vehicle-side control device and the data carrier device, operating power is supplied in a non-contacting state from the antenna coil of the vehicle-side control device to the data carrier device via the antenna coil of the data carrier device; and when communication is effected between the data carrier device and the reading device, operating power is supplied in a non-contacting state from the antenna coil of the reading device to the data carrier device via the antenna coil of the data carrier device.

According to the above-described means, when the communication between the vehicle-side control device and the data carrier device is carried out, operating power is supplied in a non-contacting state from the vehicle-side control device to the data carrier device and the operational information is recorded in the data carrier device. Further, when the communication between the data carrier device and the reading device is carried out, operating power is supplied in a non-contacting state from the reading device to the data carrier device and the operational information is transmitted by the data carrier device. For this reason, it becomes unnecessary to build a power source such as a battery into the key. Accordingly, the key is prevented from being made larger and complicatedness of battery replacement is eliminated.

EMBODIMENTS

Figure 1:
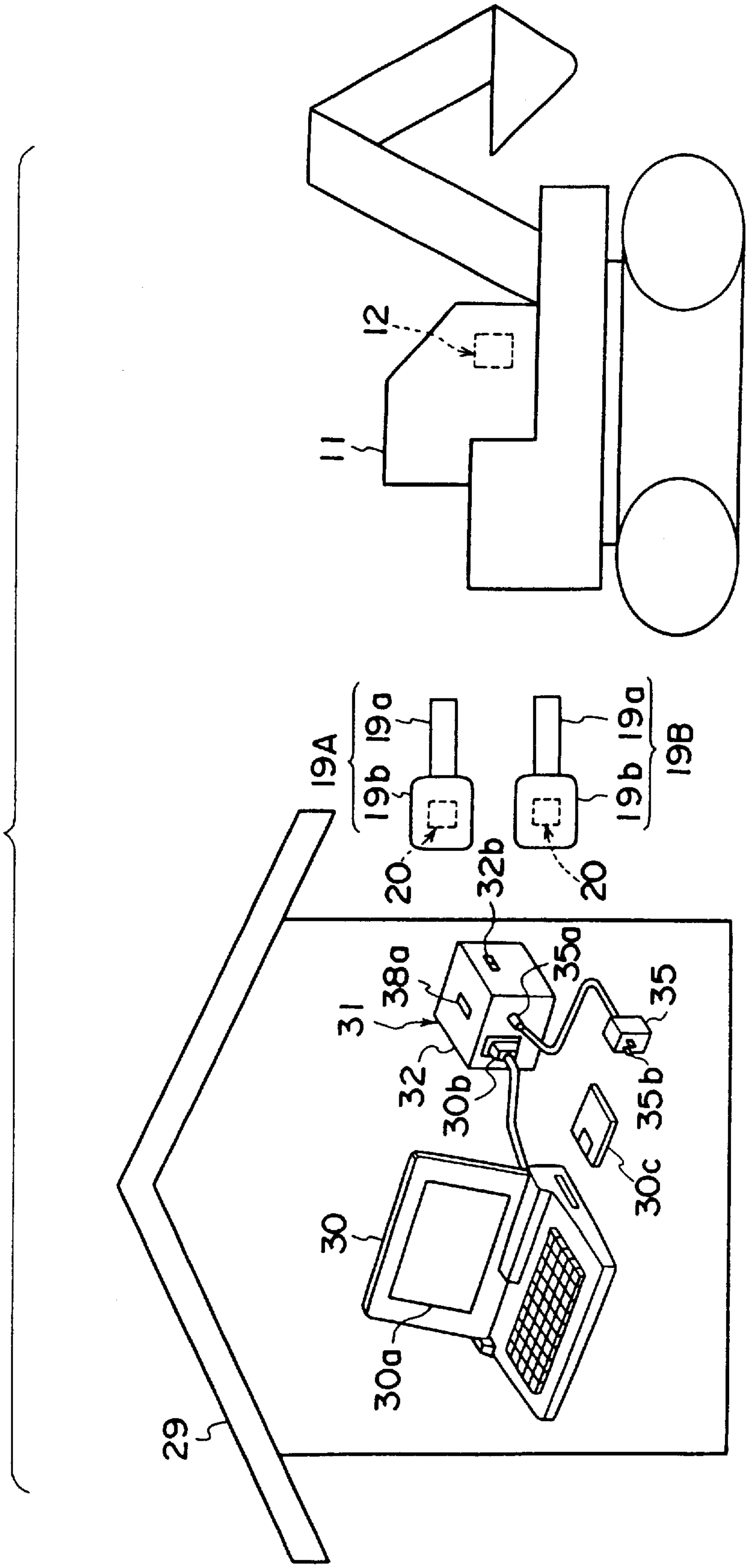
FIG. 1 is a diagram which shows an embodiment of the present invention (a diagram which schematically shows an overall structure of the present invention).

An embodiment of the present invention will be hereinafter described with reference to FIGS. 1 to 21. First, in FIG. 1, a construction vehicle 11 is equipped with a vehicle-side controller 12 corresponding to a vehicle-side control device. As shown in FIG. 8, the vehicle-side controller 12 includes a control circuit 13 having as a main body a microcomputer, a power amplifier 14, a detection circuit 15, an amplifier 16, two antenna coils 17*a* (only one is shown in the drawing), and two resonant capacitors 17*b* (only one is shown in the drawing). One antenna coil 17*a* is provided in an ignition key cylinder (not shown) and the other antenna coil 17*a* is provided in a door key cylinder (not shown).

Reference numeral 17 designates a resonant circuit comprised of the antenna coils 17*a* and the resonant capacitors 17*b*.

Figure 9:
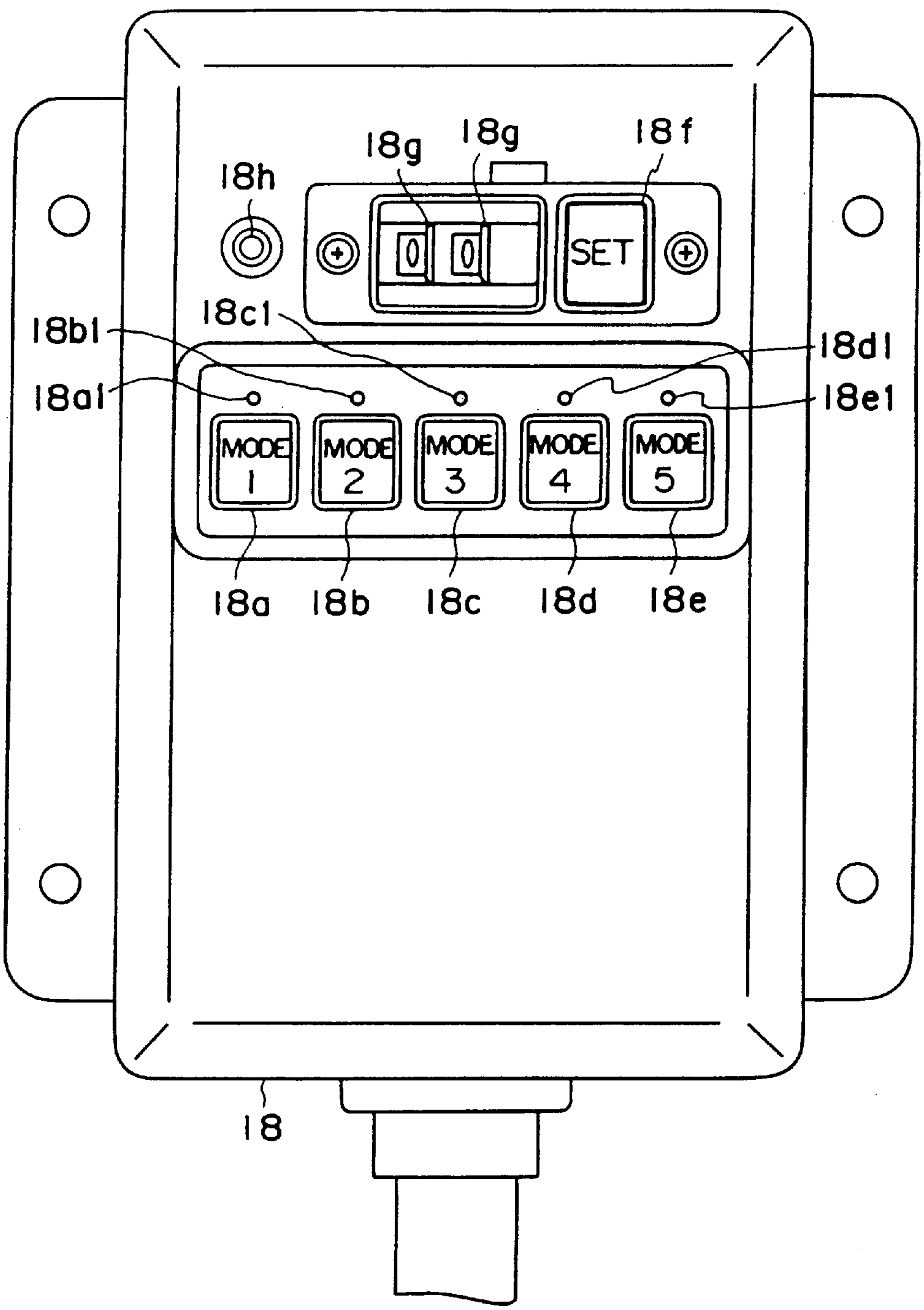
FIG. 9 is a diagram which shows an outside of the vehicle-side controller.

The control circuit 13, the power amplifier 14, the detection circuit 15, the amplifier 16, and the two resonant capacitors 17*b* are accommodated in a box 18 (see FIG. 9). As shown in FIG. 9, mounted on the front surface of the box 18 are mode switches 18*a* to 18*e*, a set switch 18*f*, two digit switches 18*g*, LEDs 18*a*1 to 18*e*1 and 18*h*. The control circuit 13 effects setting of functions in accordance with the contents of operations of the switches 18*a* to 18*g*, as will be described later. The control circuit 13 lights or turns on and off the LEDs 18*a*1 to 18*e*1 and 18*h*, and at the same time, it gives information about set states of the functions.

Figure 6:
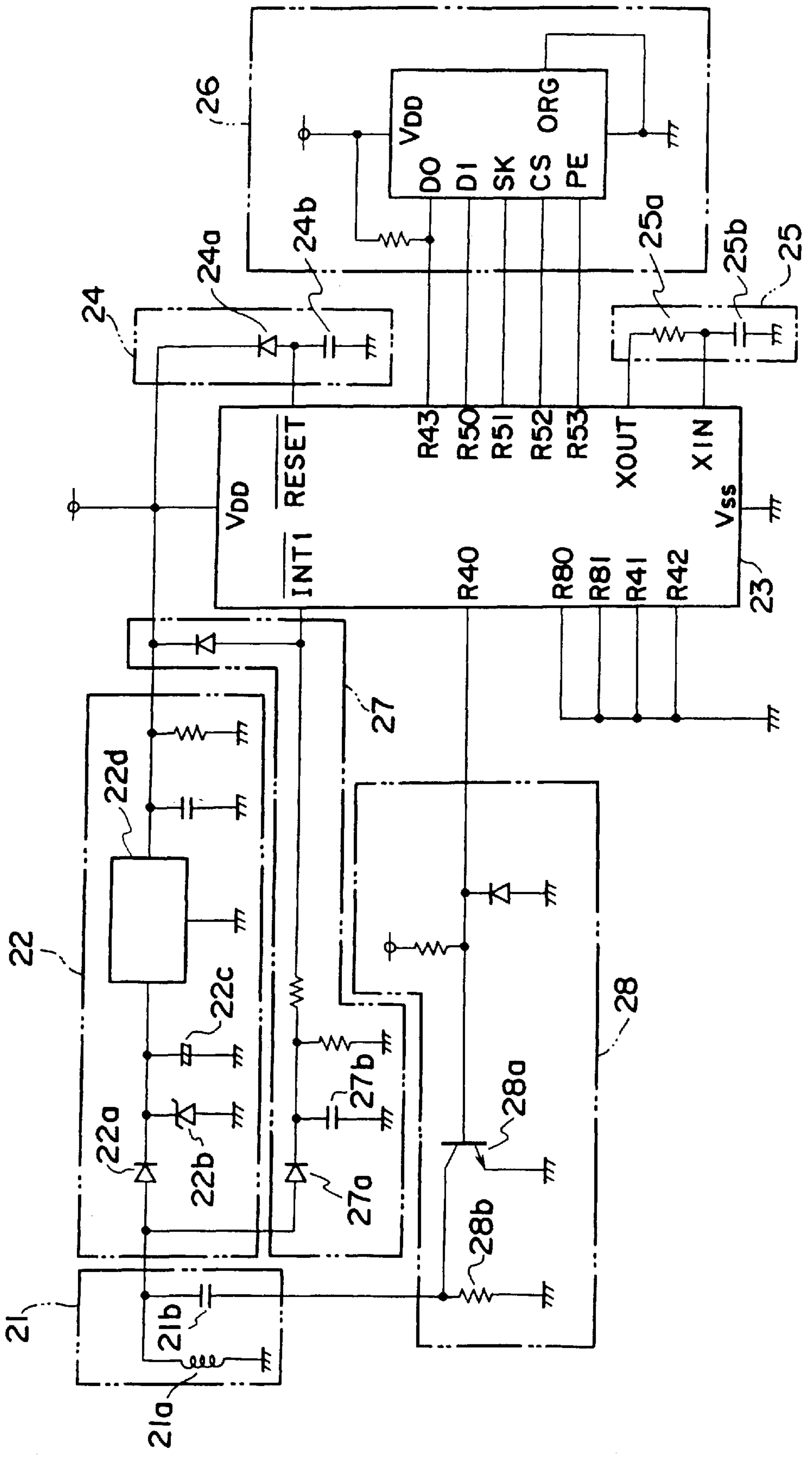
FIG. 6 is a diagram which shows an electrical structure of a transponder.

As shown in FIG. 1, a regular key 19A and a master key 19B are each formed of a main body portion 19*a* and a key grip 19*b*, and a transponder 20 is provided in each key grip 19*b*. The transponder 20 corresponds to a data carrier system. As shown in FIG. 6, the transponder 20 includes a resonant circuit 21, a power circuit 22, a control circuit 23, a reset circuit 24, a CR oscillation circuit 25, a nonvolatile memory 26 comprised of EEPROM, a detection circuit 27, and a modulation circuit 28. Meanwhile, the regular key 19A is a key carried by a driver for the purpose of driving, and the master key 19B is a key used only for registering an ID code and the like.

The resonant circuit 21 is comprised of an antenna coil 21*a* and a resonant capacitor 21*b*. When the main body portion 19*a* of the key 19A or 19B is inserted in the ignition key cylinder or in the door key cylinder, the antenna coil 17*a* at the side of the vehicle and the antenna coil 21*a* of the resonant circuit 21 are electromagnetically connected.

The vehicle-side control circuit 13 stores a control program, and accompanying an on/off operation of the power amplifier 14 based on the control program, the control circuit 13 transmits a power signal (a carrier signal shown in FIG. 10A), a level of which decreases with a predetermined timing, from each antenna coil 17*a*.

Accordingly, in a state in which the main body portion 19*a* of the key 19A or 19B is inserted in the ignition key cylinder or in the door key cylinder and the vehicle-side antenna coil 17*a* and the key-side antenna coil 21*a* are electromagnetically connected, the power signal transmitted from the vehicle-side antenna coil 17*a* is supplied to the key-side antenna coil 21*a* in a non-contacting state. Meanwhile, the resonance frequency of the resonant circuit 21 is set to be equal to a frequency band of the power signal transmitted from the side of the vehicle.

The power circuit 22 is comprised of a rectifying diode 22*a*, a diode 22*b* for a constant voltage, a smoothing capacitor 22*c*, a constant-voltage circuit 22*d*, and the like, and produces a direct-current power source by rectifying and smoothing the power signal received by the key-side antenna coil 21*a*. Further, the control circuit 23 is mainly comprised of a microcomputer. The direct current power source formed by the power circuit 22 is supplied to a power terminal VDD of the control circuit 23 and the control circuit 23 is driven by the direct current power source from the power circuit 22.

The reset circuit 24 is comprised of a diode 24*a* and a capacitor 24*b*, and until the direct current power source supplied to the power terminal VDD reaches a predetermined level, the control circuit 23 is held in a power-on reset state. Further, the CR oscillation circuit 25 is comprised of a resistance 25*a* and a capacitor 25*b* and determines a clock frequency of the control circuit 23.

Figure 7:
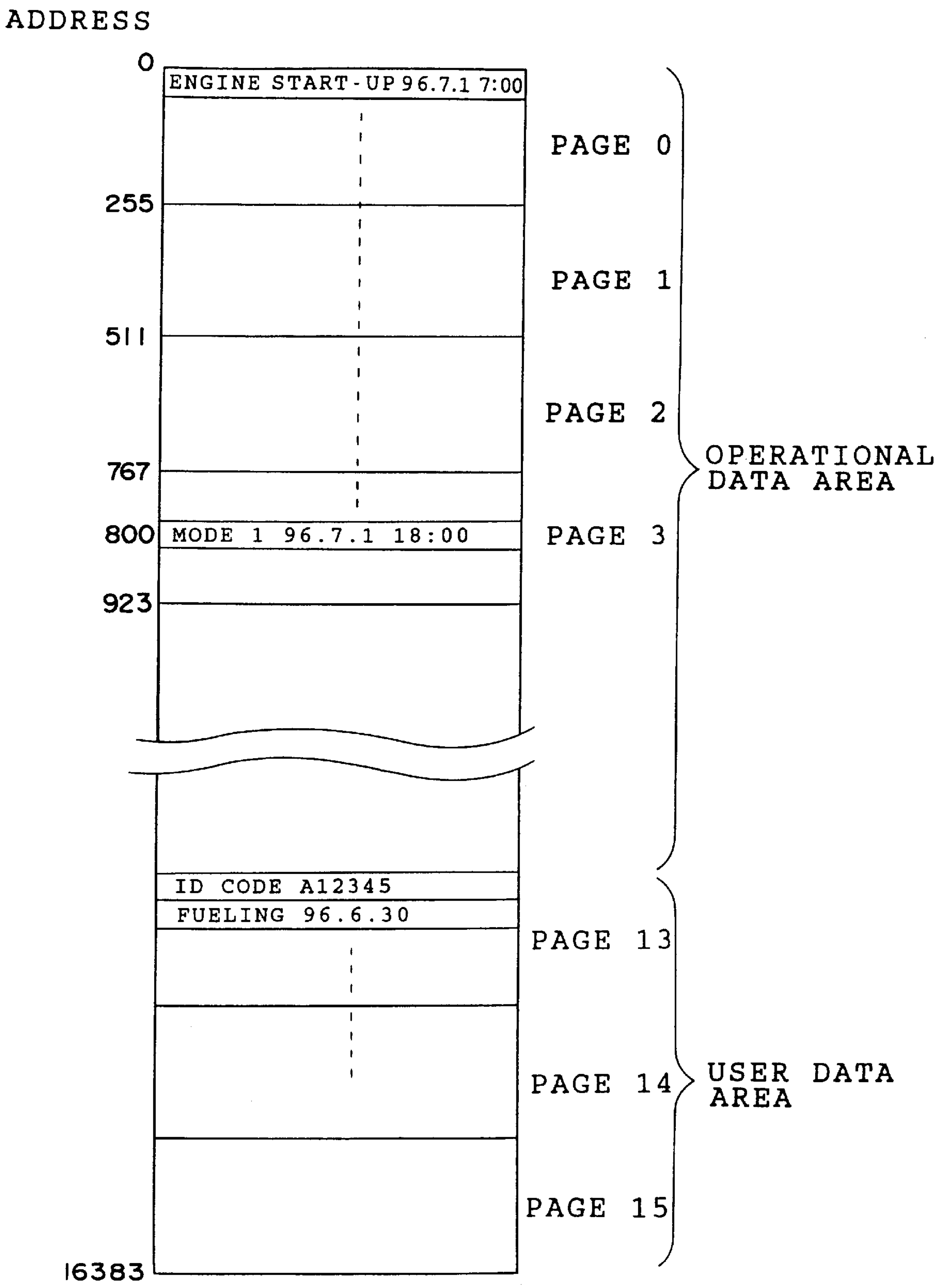
FIG. 7 is a diagram which shows a data layout of a nonvolatile memory.
Figure 8:
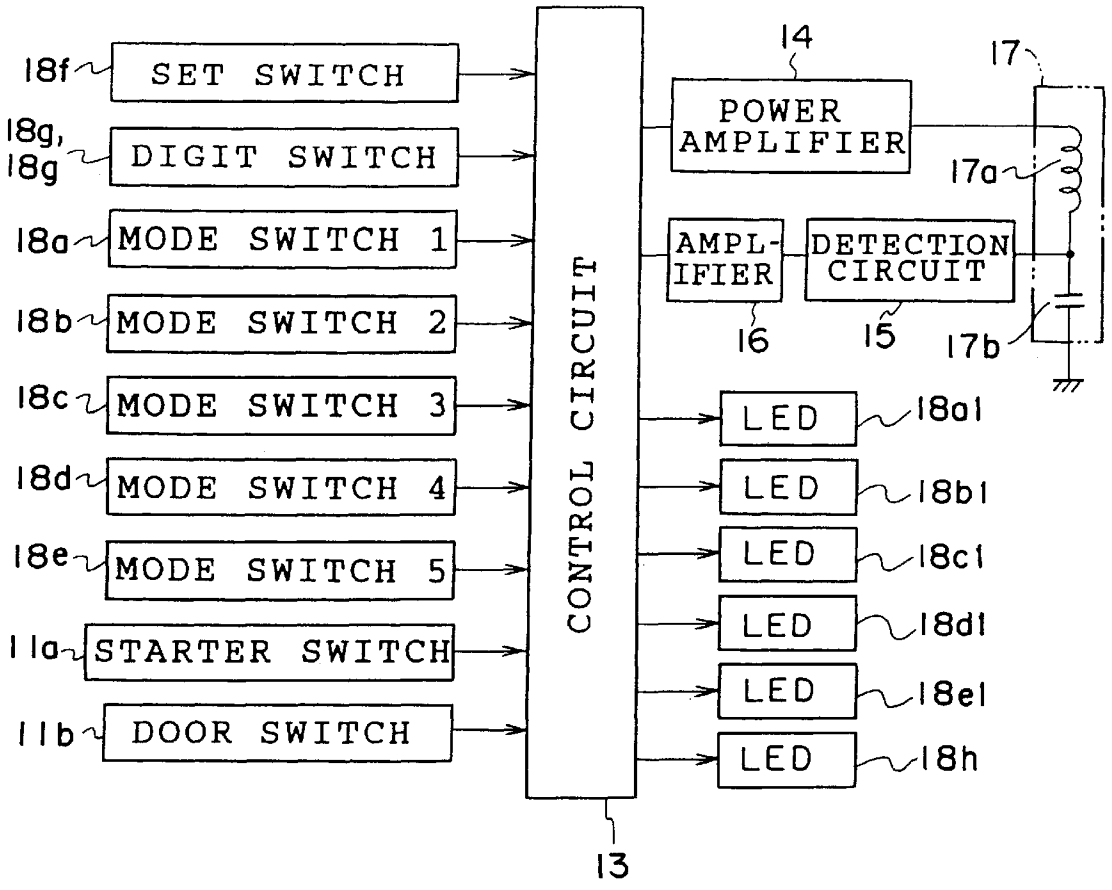
FIG. 8 is a diagram which shows an electrical structure of a vehicle-side controller.

Addresses 0 to 2047 (8-bit×2,048 addresses) of the nonvolatile memory 26 are, as shown in FIG. 7, divided into pages 0 to 15 (the numbers indicated at a left end side of the drawing are boundary addresses of pages 0 to 15). The pages 0 to 15 are divided into an operational data area in which operational data is written and a user data area in which user data such as optional carrying data is written. Addresses 0 to 31 of the operational data area are provided as a system area and an ID code is in advance recorded in the system area.

Meanwhile, the operational data and the user data each correspond to vehicle data. Further, the system area also stores, in addition to the ID code, the following key information (each key information will be described later): system code; password; setting information for an operational data area password; setting information for a user data area password; setting information for user data area write protect, area setting information, a recording start page; and an R/W update counter.

Figures 10A, 10B:
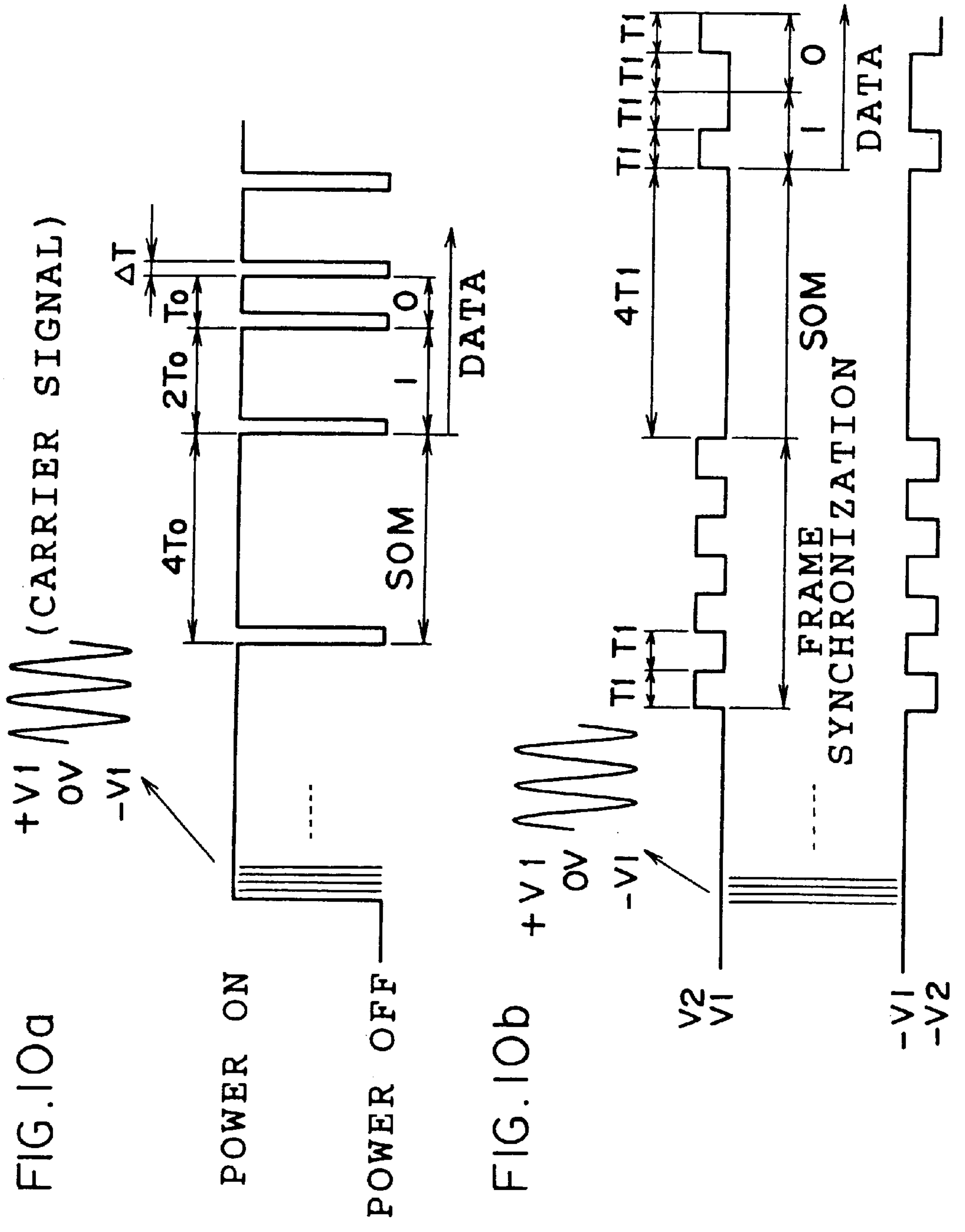
FIG. 10*a* and FIG. 10*b* are diagrams which show communication waveforms of the vehicle-side controller, the transponder, and the R/W device.

The detection circuit 27 is, as shown in FIG. 6, comprised of a detecting diode 27*a*, a capacitor 27*b*, and the like. The detection circuit 27 shapes the power signal received by the key-side antenna coil 21*a*, and further, removes noise from the power signal and supplies it to the key-side control circuit 23. FIG. 10(A) shows the power signal to be supplied from the detection circuit 27 to the control circuit 23.

As shown in the same figure, when the key-side control circuit 23 detects inputting of SOM (Start Of Message), the control circuit 23 starts reading data and make a determination about the contents of a command of the power signal transmitted from the vehicle-side control circuit 13 based on the subsequent power signals. Then, based on the result of this determination, the control circuit 23 reads the user data from the user data area of the nonvolatile memory 26 or writes operational data (corresponding to the operational information) in the operational data area.

Meanwhile, a time constant of the detection circuit 27 allows shaping of the power signal, and therefore, it is set to be smaller than that of the power circuit 22. Further, in FIG. 10A, ΔT corresponds to an off time of the power amplifier 14 controlled by the vehicle-side control circuit 13.

The modulation circuit 28 is, as shown in FIG. 6, comprised of a transistor 28*a*, a resistance 28*b*, and the like. The key-side control circuit 23 changes an impedance of the resonant circuit 21 by turning on or off the transistor 28*a* and responds to the contents of a command from the vehicle-side control circuit 13. As a result, synchronously with the change in the impedance of the resonant circuit 21, the amplitude of a response signal (a carrier signal shown in FIG. 10*b*) received by the vehicle-side antenna coil 17*a* changes.

The detection circuit 15 at the side of the vehicle shapes the response signal received by the antenna coil 17*a* and supplies it to the control circuit 13 via the amplifier 16. FIG. 10*b* shows a response signal supplied to the control circuit 13. As shown in this drawing, when the control circuit 13 detects inputting of SOM after frame synchronization, the control circuit 13 starts reading data and makes a determination about the contents of a response from the key-side control circuit 23 based on the subsequent response signals.

Next, an operation of the above-described structure will be described. First, in a case of receiving/transmitting data between both control circuits, the following preliminary operation is carried out.

[Registration of key (when the master key 19B is used)]

The master key 19B is inserted in the ignition key cylinder. After 10 seconds or more have elapsed with a starter switch 11*a* (see FIG. 8) of the vehicle 11 set in an OFF state, the starter switch 11*a* is turned to ACC. As a result, the vehicle-side control circuit 13 switches the power amplifier 14 on or off, and at the same time, transmits a power signal which indicates "send an ID code" to the key-side control circuit 23.

When the key-side control circuit 23 receives the power signal, it is activated to determine the contents of a command of the power signal, and further reads out the ID code from a system area of the nonvolatile memory 26. Then, the control circuit 23 switches the transistor 28*a* of the modulation circuit 28 on or off so as to transmit the ID code to the vehicle-side control circuit 13.

The nonvolatile memory of the vehicle-side control circuit 13 stores in advance an ID code of the master key 19B. When the control circuit 13 receives the ID code of the master key 19B from the key-side control circuit 23, the control circuit 13 reads out the ID code from the nonvolatile memory and compares it with an ID code from the key side. In this case, these ID codes coincide with each other, and therefore, the control circuit 13 switches the LED 18*a*1 on and off to indicate that the process has proceeded to a key registration mode.

When it is determined that the LED 18*a*1 has been switched on and off, the regular key 19A is inserted in the ignition key cylinder and turned to ACC within ten seconds after the starter switch 11*a* has been turned to OFF. As a result, the vehicle-side control circuit 13 reads out the ID code from the regular key 19A in the above-described procedure and writes the ID code in the nonvolatile memory for registration. Then, the control circuit 13 turns on the LED 18*a*1 for five seconds and indicates registration of the regular key 19A.

When the LED 18*a*1 is turned off, another regular key 19A is inserted in the ignition key cylinder and turned to ACC within ten seconds after the starter switch 11*a* has been turned to OFF. As a result, the vehicle-side control circuit 13 reads out an ID code from the regular key 19A in the above-described procedure and writes the ID code in the nonvolatile memory for registration. Then, the control circuit 13 turns on the LED 18*a*1 for five seconds, to thereby indicate registration of this regular key 19A.

When the above-described registration for all the regular keys 19A has been completed, the starter switch 11*a* is turned to START after it is confirmed that the LED 18*a*1 is turned off. As a result, the vehicle-side control circuit 13 recognizes that the registration of the keys has been completed, and turns on and off all the LEDs 18*a*1 to 18*e*1 and 18*h* a plurality of times (for example, twice) so as to indicate completion of the registration of the keys. Meanwhile, the maximum number of the regular keys 19A which can be registered is three, and two master keys 19B are provided.

[Registration of master code]

A master code is required when registration of a key is effected without using the master key 19B, and is registered in the following procedure. After the regular key 19A is inserted in the ignition key cylinder and is turned to ACC, the mode switches 18*a* to 18*e* are selectively operated by pressing five times. Here, the vehicle-side control circuit 13 stores numerical values 1 to 5 correspondingly to the mode switches 18*a* to 18*e*, and sets the master code in accordance with which of the mode switches 18*a* to 18*e* have been operated. For example, when the mode switches 18*e*, 18*d*, 18*c*, 18*b*, and 18*a* are operated sequentially, the master code is set at "54321".

After the mode switches 18*a* to 18*e* have been selectively operated five times, the set switch 18*f* is continuously pressed for four seconds or more. As a result, the vehicle-side control circuit 13 makes a determination that inputting of the master code has been completed, and registers the master code at "54321". Then, the control circuit 13 turns the LED 18*h* on and off a plurality of times (for example, five times) so as to indicate that the registration of the master code has been completed.

[Registration of key (when the master key 19B is not used)]

After the regular key 19A is inserted in the ignition key cylinder and ten seconds or more have elapsed with the starter switch 11*a* being set in an OFF state, the regular key is turned to ACC and the master code is inputted. Inputting of the master code is effected in the same procedure as explained in the section, "registration of a master code", which has already been described.

As a result, the vehicle-side control circuit 13 turns the LED 18*a*1 on and off and indicates that the process has proceeded to a key registration mode. Then, the ID code is read out from the regular key 19A in the above-described procedure and is written in the nonvolatile memory for registration. Meanwhile, registration of the second and subsequent keys is effected in the same way as in the case of using the master key 19B.

[Registration of secret identification code]

A secret identification code is required when a system is stopped due to reasons of loss or failure of a registered key, or other reasons. The secret identification code is registered in the following procedure. Meanwhile, stoppage of the system will be described later.

The regular key 19A or the master key 19B is inserted in the ignition key cylinder, and an operation set including the following operations (1) and (2) is carried out four times (sets).

(1) the key 19A or 19B is turned in the order of (OFF) →ACC→OFF, only N times (N is an integer of 1 to 9); and (2) the key 19A or 19B is turned in the order of (OFF) →HEAT→OFF, only once.

For example, when N=1 in a first set, N=2 in a second set, N=3 in a third set, and N=4 in a fourth set, it is confirmed by the vehicle-side control circuit 13 that the secret identification code is "1234".

After the secret identification code is inputted, the key 19A or 19B is held at the position of HEAT for four seconds or more. As a result, the vehicle-side control circuit 13 ends the registration of the secret identification code "1234" and turns the LED 18*h* on and off a plurality of times (for example, five times), so as to indicate that the registration of the secret identification code has been completed.

[Setting of internal clock]

An internal clock becomes a reference for detection of operational data such as the date and time of a start-up of an engine and is set in the following procedure.

After the starter switch 11*a* has been turned to ACC by the regular key 19A, the set switch 18*f* is continuously pressed for four seconds or more. As a result, the vehicle-side control circuit 13 turns the LEDs 18*a*1 to 18*e*1 and 18*h* on and off a plurality of times (for example, three times), and thereafter, the control circuit 13 stops an on-and-off state of the LED 18*h* and holds only the LEDs 18*a*1 to 18*e*1 in an on-and-off state, and indicates that the process has proceeded to a clock setting mode.

When the set switch 18*f* is operated, an operation set including an operation of the digit switches 18*g* and an operation of the set switch 18*f* is effected five times (sets), and at the same time, the year, month, date, time, and minute are sequentially inputted. As a result, the vehicle-side control circuit 13 sets, based on an output signal from the digit switches 18*g*, the year, month, date, time, and minute of the internal clock. At the same time, the LEDs 18*a*1 to 18*e*1 are sequentially turned off each time setting of the year, month, date, time, and minute is completed. Then, the control circuit 13 turns the LEDs 18*a*1 to 18*e*1 and 18*f* on and off a plurality of times (for example, twice) to thereby indicate completion of setting the internal clock.

Meanwhile, in effecting "registration of master code", "registration of secret identification code", and "setting of internal clock", when the starter switch 11*a* is turned to ACC, the vehicle-side control circuit 13 transmits to the key-side control circuit 23 a power signal which indicates, "transfer ID code". As a result, the key-side control circuit 23 reads out the ID code from the system area of the nonvolatile memory 26 and transmits the ID code to the vehicle-side control circuit 13.

When the vehicle-side control circuit 13 receives the ID code, it reads out the registered ID code from the nonvolatile memory and compares the same with an ID code from the key side. Here, only when the ID code from the key side exists among the read ID codes, are "registration of master code", "registration of secret identification code", and "setting of internal clock" allowed.

[Assignment of operation mode to mode switches]

The mode switches 18*a* to 18*e* are used to allow the vehicle-side control circuit 13 to recognize which operation is being effected at present (for example, when operation of mode 1 is effected, the mode switch 18*a* is operated, reporting to the control circuit 13 that the operation of a mode 1 is being effected). It is preferable that an assigned operation mode be clearly shown in the vicinity of the mode switches 18*a* to 18*e* so as to prevent malfunction of the mode switches 18*a* to 18*e*.

Next, an operation of the above-described structure will be described.

[Door security function]

After the regular key 19A has been inserted in the door key cylinder and turned to the right side (i.e., the side of locking) or to the left side (i.e., the side of lock release), the regular key 19A is turned back to an original position. As a result, the vehicle-side control circuit 13 transmits a power signal which indicates, "transmit ID code", to the key-side control circuit 23 and it is determined by the control circuit 13 whether the ID code received from the key-side control circuit 23 has been registered. For example, when the ID code from the key side has been registered, a lever disposed at a back side of the door key cylinder and a door locking mechanism are linked together so that a door is brought into an unlockable state. Accordingly, in this state, when the regular key 19A is turned to the left side (i.e., the side of lock release), the door is unlocked.

Further, when the ID code from the key side is not registered, the vehicle-side control circuit 13 records in the nonvolatile memory the fact that there was abnormality in the security aspect. At the same time, the control circuit 13 effects an operation for causing a horn (not shown) of the vehicle 11 to make a sound for a predetermined time (for example, 30 seconds) and an operation for turning on and off a light (not shown) of the vehicle 11 for a predetermined time (for example, 4 minutes), to thereby indicate that there was abnormality in the security aspect. Meanwhile, in FIG. 8, reference numeral 11*b* designates a door switch, which is turned on together with rotation of the door key cylinder. The vehicle-side control circuit 13 detects, based on an on signal from the door switch 11*b*, that the regular key 19A has been turned.

[Immobilizer function]

The regular key 19A is inserted in the ignition key cylinder and is turned to ACC or to HEAT. As a result, the vehicle-side control circuit 13 transmits to the key-side control circuit 23 a power signal which indicates, "transmit ID code", and it is determined by the control circuit 13 whether the ID code received from the key-side control circuit 23 has been registered.

For example, when the ID code from the key side has been registered, the vehicle-side control circuit 13 turns on a main power source of the vehicle 11 to allow the start-up of the engine. Further, when the ID code from the key side has not been registered, the vehicle-side control circuit 13 records in the nonvolatile memory the fact that there was abnormality in the security aspect. At the same time, the control circuit 13 effects the operation for causing the horn to make a sound and the operation for turning the light on and off, to thereby indicate that there was abnormality in the security aspect.

Meanwhile, when the vehicle-side control circuit 13 detects any one of the following operations (1) and (2), the control circuit 13 stops causing the horn to make a sound and turning the light on and off.

(1) The registered regular key 19A or the registered master key 19B is used to turn the starter switch 11*a* to HEAT or to ACC.

(2) The registered regular key 19A or the registered master key 19B is used to turn the door switch 11*b* (to either of the right and left sides).

[Operational data recording function]

When the engine is started, the vehicle-side control circuit 13 transmits, to the key-side control circuit 23, a power signal which indicates, "record operational data", and a power signal which indicates the "date and time of the start-up of the engine". As a result, the key-side control circuit 23 writes the date and time of the start-up of the engine in the operational data area of the nonvolatile memory 26. In this case, the system area is provided in a beginning portion of the operational data area, and therefore, writing of the operational data is executed with the 32-th address of page 0 set as a top address.

When the engine is started, the vehicle-side control circuit 13 measures on-time T1 to T5 of the mode switches 18*a* to 18*e* and an off-time T0 in which none of the mode switches 18*a* to 18*e* is turned on.

For example, when the mode switch 18*a* corresponding to the mode 1 is operated, the vehicle-side control circuit 13 effects an addition of an operating time counter 1, so as to measure the operating time T1 of the mode 1. In this state, when the mode switch 18*b* corresponding to an operation mode 2 is operated, the control circuit 13 effects an addition of an operating time counter 2, so as to measure the operating time T2 of the operation mode 2.

When the vehicle-side control circuit 13 measures the on-time T1 to T5 and the off-time T0, it transmits the operation mode to the key-side control circuit 23 at six-minute intervals and records the operation mode (see FIG. 13) for each unit of time. The operation mode having the longest operating time during the interval of six minutes is transmitted. For example, when the on-time of the mode switch 18*a* is one minute, the on-time of the mode switch 18*b* is two minutes, and the on-time of the mode switch 18*c* is three minutes, the control circuit 13 transmits that the operation mode of six minutes is "mode 3" corresponding to the mode switch 18*c*. Meanwhile, when the off-time T0 is the longest, "mode 0" is transmitted.

[Past history function of security]

The vehicle-side control circuit 13 records, as described above, a past history in terms of the security aspect during stoppage of the engine. When the engine is started, the control circuit 13 reads out the past history in terms of the security aspect from the nonvolatile memory and transmits a command signal, "record data", and "past history of security" data. As a result, the key-side control circuit 23 writes the "past history in terms of the security aspect" in the operational data area of the nonvolatile memory 26.

[System stopping function]

The regular key 19A or the master key 19B (which may also be an unregistered key) is inserted in the starter switch 11*a* and the operation described in the section of "registration of secret identification code" is effected, and at the same time, the secret identification code is inputted. As a result, the vehicle-side control circuit 13 stops "operational data recording function", "immobilizer function", and "door security function" and turns the LED 18*h* on and off a plurality of times (for example, five times), and at the same time, the control circuit 13 indicates that the system is down.

Meanwhile, the stoppage of the system is also executed by inserting the regular key 19A or the master key 19B (which may also be an unregistered key) in the door key cylinder and by inputting the secret identification code. In this case, inputting of the secret identification code is executed by turning the key 19A or 19B in the order of, (OFF)→the right side (the side of locking)→OFF. Further, determination of the inputting is made in the order of, (OFF)→the left side (the side of lock release)→OFF.

[Set-up of system]

When the regular key 19A or the master key 19B (which may also be an unregistered key) is inserted in the starter switch 11*a* in a system-down state and the operation described in the section of "registration of secret identification code" is effected, at the same time, a secret identification code is inputted. As a result, the vehicle-side control circuit 13 effects set-up of the system.

As shown in FIG. 1, a desktop personal computer 30 (hereinafter referred to as a personal computer 30) corresponding to an external controller is installed in an office 29. Connected to the personal computer 30 is a read/write device 31 (hereinafter referred to as an R/W device 31) corresponding to a reading device. The R/W device 31 will be hereinafter described in detail.

Figure 2:
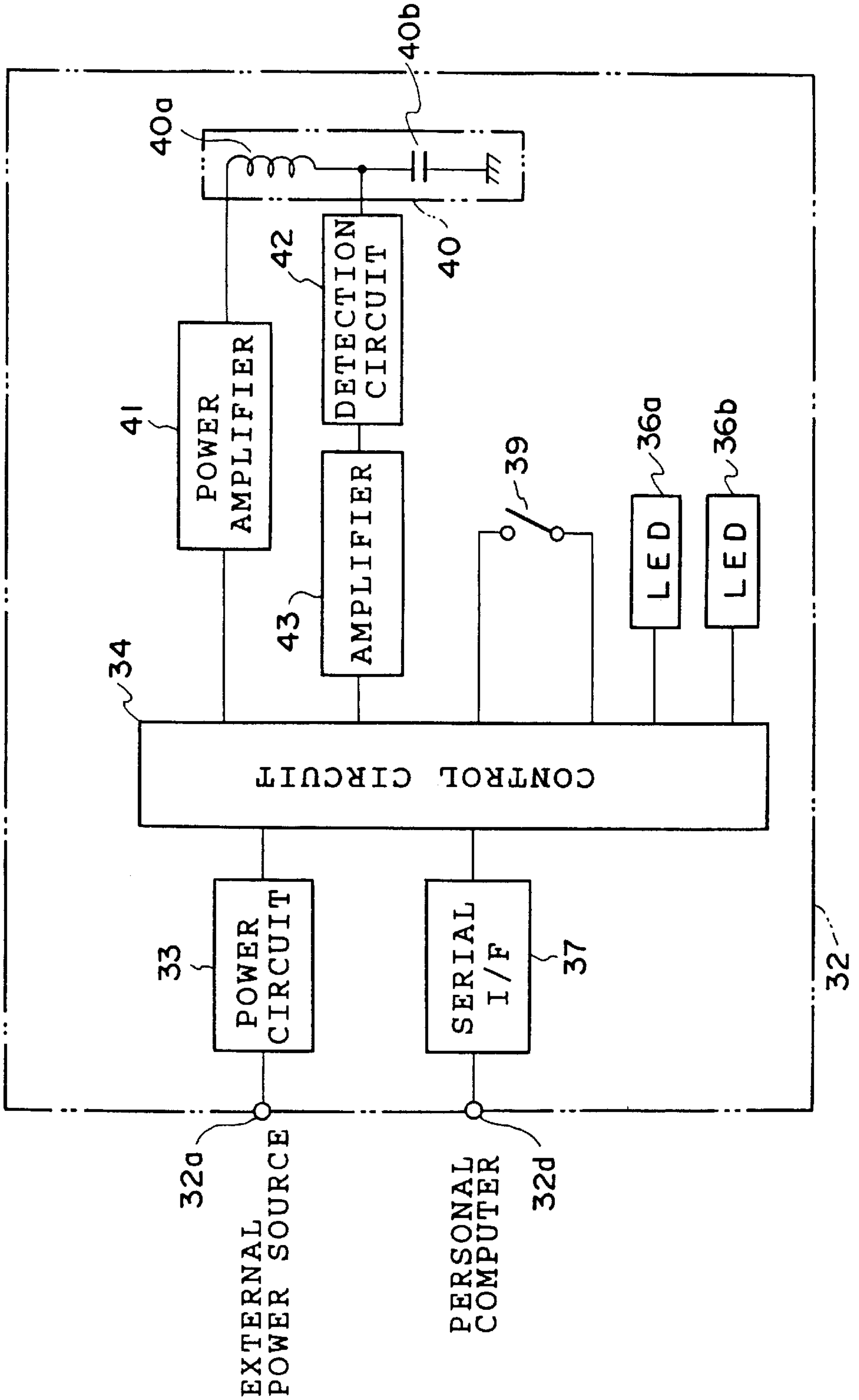
FIG. 2 is a diagram which shows an electrical structure of an R/W device.

As shown in FIG. 2, a box 32 includes a power circuit 33 and a control circuit 34 mainly comprised of a microcomputer. A jack 32*a* (see FIG. 5) and a power switch 32*b* (see FIG. 3) are mounted to the box 32. As shown in FIG. 1, after a plug 35*a* of an AC adapter 35 is inserted in the jack 32*a* and a receptacle 35*b* of the AC adapter 35 is inserted in a commercial AC power source (not shown), when the power switch 32*b* is turned on, a power source is supplied to the control circuit 34 via the power circuit 33 and the control circuit 34 is thereby driven.

Figure 4:
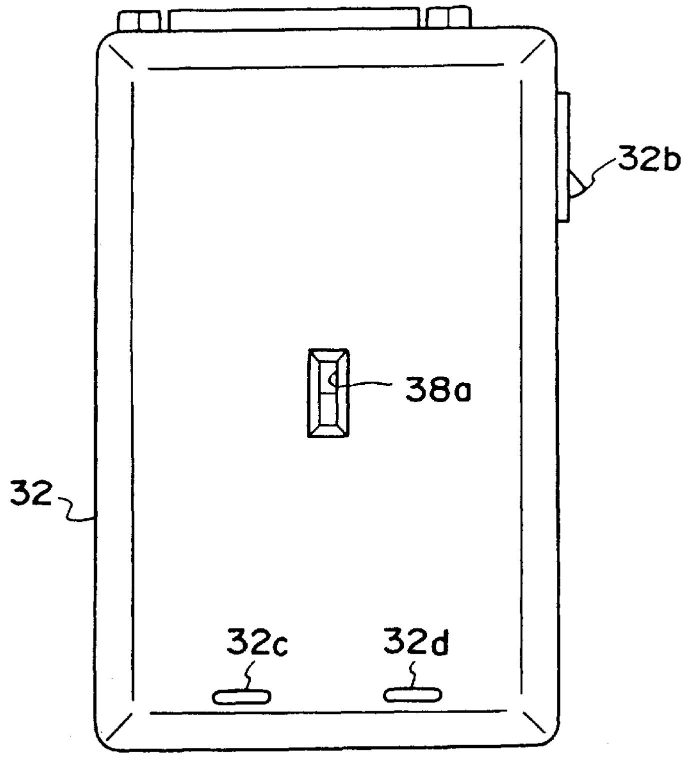
FIG. 4 is a top view which shows the R/W device.

A green indicator lens 32*c* is, as shown in FIG. 4, mounted to the box 32. As shown in FIG. 2, an LED 36*a* is provided within the box 32 and the control circuit 34 supplies a power source to the LED 36*a* by the power switch 32*b* being turned on. As a result, the indicator lens 32*c* is lighted to indicate that the power source is on.

Figure 5:
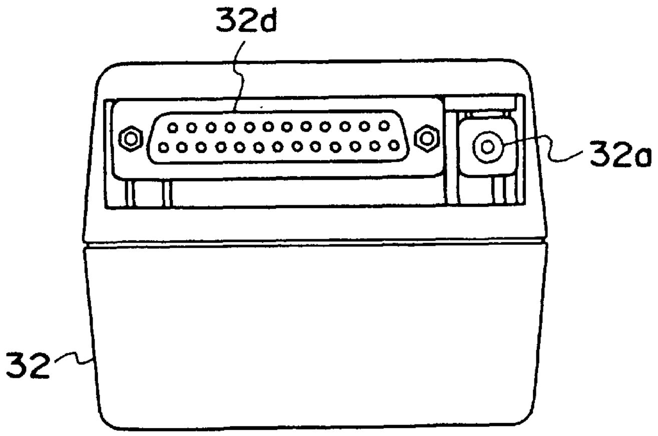
FIG. 5 is a side view which shows the R/W device.

A serial interface 37 is provided in the box 32. Further, a connector 32*d* is, as shown in FIG. 5, mounted to the box 32. As shown in FIG. 1, when a connector 30*b* of the personal computer 30 is inserted in the connector 32*d*, the control circuit 34 and the personal computer 30 are connected via the serial interface 37 so as to allow serial communication between the personal computer 30 and the control circuit 34.

Figure 3:
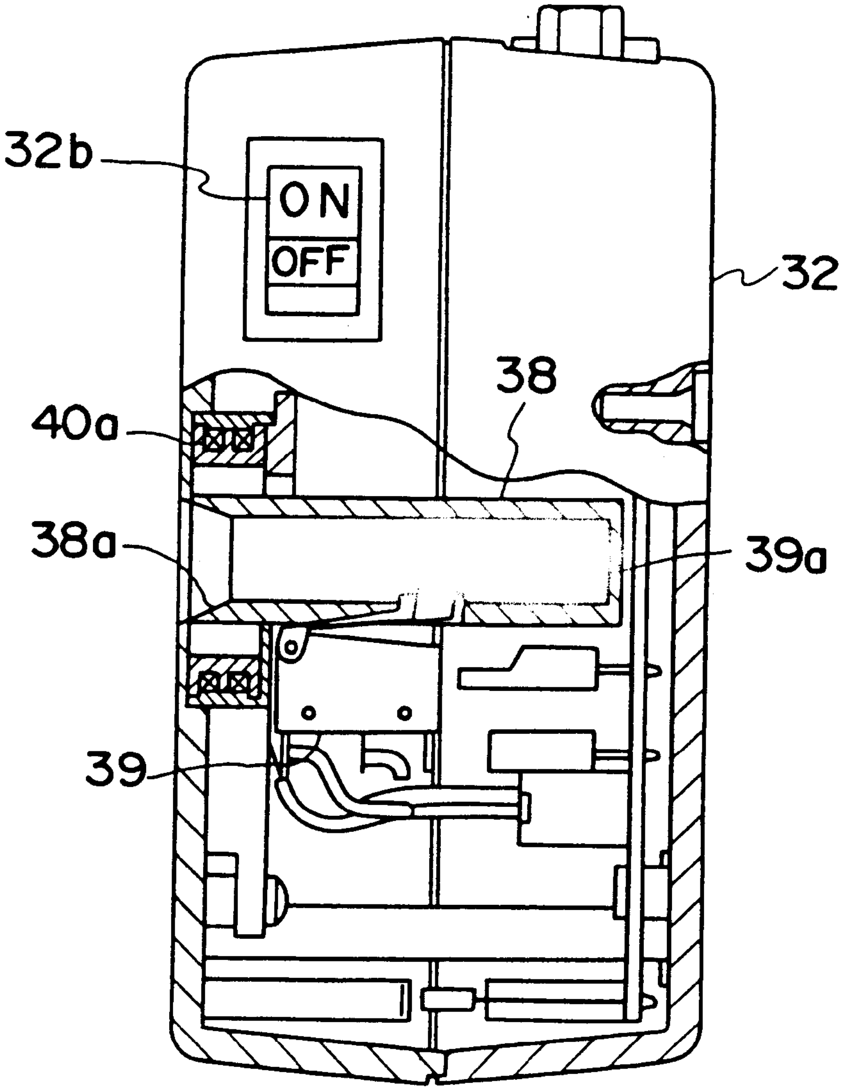
FIG. 3 is a front view which shows the R/W device in a partially broken state.

As shown in FIG. 3, a cylindrical body 38 is provided in the box 32. The cylindrical body 38 has a rectangular cross-sectional configuration having one end surface that is open and another end surface that is closed. One end surface 38*a* of the cylindrical body 38 is, as shown in FIG. 4, exposed to the outside by passing through a side plate of the box 32.

A key detection switch 39 is, as shown in FIG. 3, provided in the box 32 and a plunger 39*a* of the key detection switch 39 is disposed within the cylindrical body 38. When the main body portion 19*a* of the regular key 19 or the main body portion 19*a* of the master key 19B is inserted from the one end surface 38*a* (hereinafter referred to as a key insertion opening 38*a*) of the cylindrical body 38 into the cylindrical body 38, the plunger 39*a* is pressed downward by the main body portion 19*a* and the key detection switch 39 is turned on.

An antenna coil 40*a* is mounted at one end portion of the cylindrical body 38, and when the main body portion 19*a* of the regular key 19A or the main body portion 19*a* of the master key 19B is inserted into the key insertion opening 38*a*, the antenna coil 40*a* and the key-side antenna coil 21*a* are connected electromagnetically. In FIG. 2, reference numeral 40*b* designates a resonant capacitor which forms, together with the antenna coil 40*a*, a resonant circuit 40.

The antenna coil 40*a* is, as shown in FIG. 2, connected to the control circuit 34 via the power amplifier 41. The control circuit 34 turns the power amplifier 41 on or off based on a command signal transmitted from the personal computer 30 via the serial interface 37, and at the same time, the control circuit 34 transmits a power signal (carrier signal) whose level decreases with a predetermined timing from the antenna coil 40*a* to the key-side antenna coil 21*a*.

The above-described power signal is the same as that supplied from the vehicle-side control circuit 13 to the key-side control circuit 23. As shown in FIG. 10A, the key-side detection circuit 27 shapes the power signal received via the antenna coil 21*a* and supplies the same to the control circuit 23. As a result, the control circuit 23 detects inputting of SOM, and at the same time, it starts reading data and determines the contents of a command based on the subsequent power signals. Then, the control circuit 23 turns the transistor 28*a* of the modulation circuit 28 on or off, and at the same time, transmits a response signal from the antenna coil 21*a* to the antenna coil 40*a* at the side of the R/W device.

As shown in FIG. 2, a detection circuit 42 and an amplifier 43 are provided in the box 32. The detection circuit 42 shapes the response signal received by the antenna coil 40*a* and supplies the same to the control circuit 34 via the amplifier 43. The response signal is the same as that transmitted from the key-side control circuit 23 to the vehicle-side control circuit 13. As shown in FIG. 10*b*, after frame synchronization, the control circuit 34 at the side of the R/W device detects inputting of SOM, and at the same time, starts reading the response signal and determines the contents of a response based on the subsequent response signals.

As shown in FIG. 4, a red indicator lens 32*d* is mounted to the box 32. Further, as shown in FIG. 2, an LED 36*b* is also provided in the box 32. The control circuit 34 at the side of the R/W device supplies a power source to the LED 36*b*, and at the same time, lights the indicator lens 32*d* to indicate communication between the R/W device 31 and the key 19A (or 19B).

Next, an operation of the above-described structure will be described.

[Read/storage function of operational data]

Figure 11A:
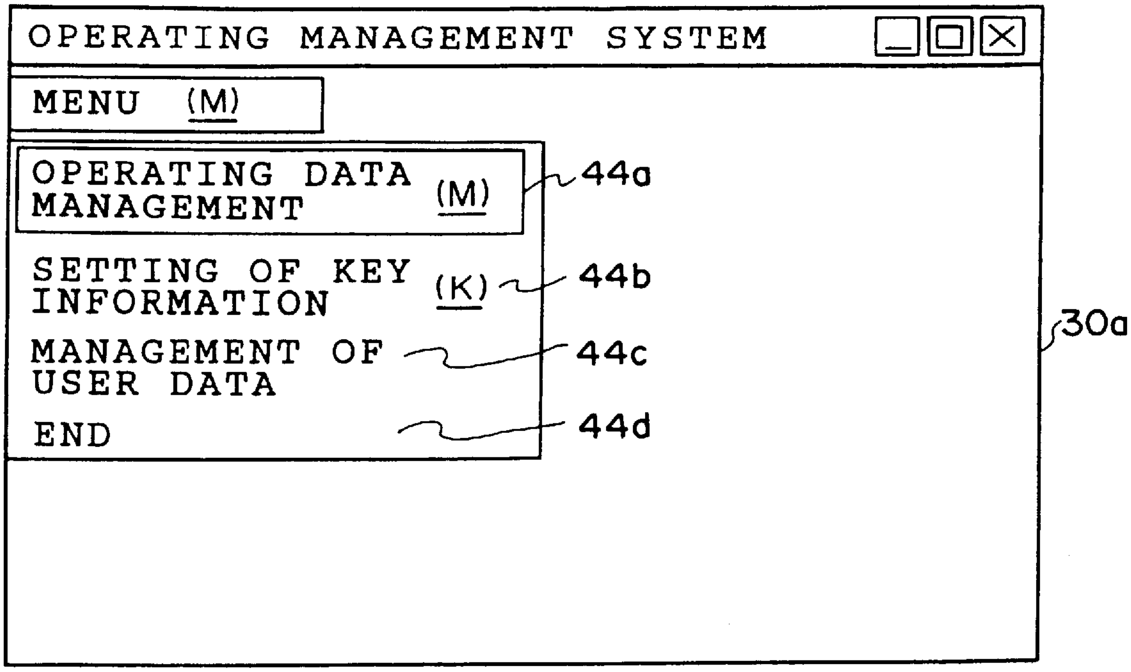
FIG. 11*a* and FIG. 11*b* are diagrams which each show an image surface of a personal computer.
Figure 11B:
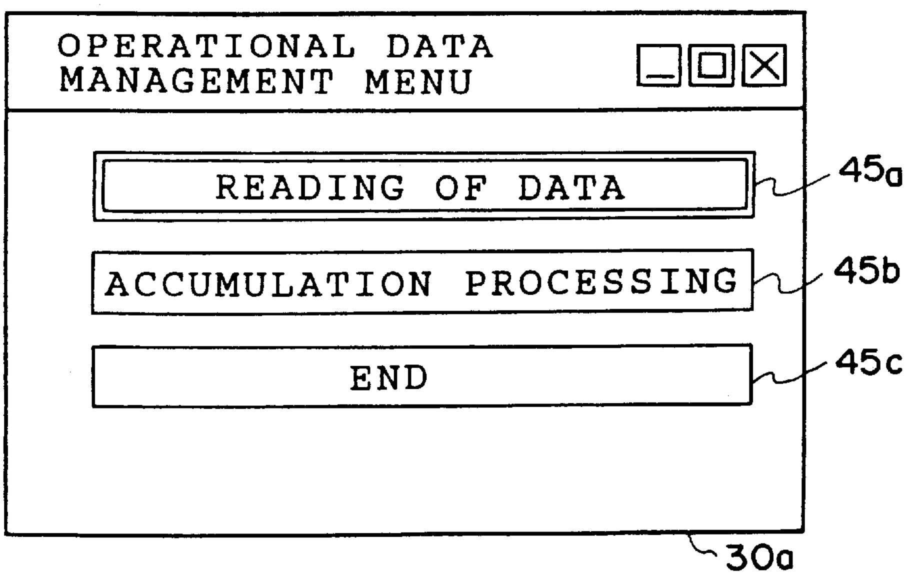

After the power switch 32*b* of the R/W device 31 is turned on and the main body portion 19*a* of the regular key 19A is inserted into the key insertion opening 38*a*, when the personal computer 30 is activated, the personal computer 30 displays, on a display device 30*a* (see FIG. 1), an operational data management key 44*a*, a key information setting key 44*b*, a user data management key 44*c*, and a termination key 44*d*, which are shown in FIG. 11A. When the operational data management key 44*a* is clicked, as shown in FIG. 11*b*, a data reading key 45*a*, an accumulation processing key 45*b*, and a termination key 45*c* are displayed.

When the data reading key 45*a* is clicked in the above-described state, the personal computer 30 gives a command signal which indicates, "detect the presence or absence of a key", to the control circuit 34 at the side of the R/W device. As a result, the control circuit 34 at the side of the R/W device determines, based on an output signal from the key detection switch 39, whether there is any key, and further transmits the result of this determination to the personal computer 30.

For example, when it is determined that there is no key, the personal computer 30 displays a message on the display device 30*a* and requires insertion of the regular key 19A. Further, when it is determined that there is a key, the personal computer 30 transmits a command signal which indicates, "read an ID code", to the control circuit 34 at the side of the R/W device.

When the control circuit 34 at the side of the R/W device receives the command signal, the control circuit 34 turns the power amplifier 41 on or off, and simultaneously, transmits a power signal which indicates, "transmit ID code", from the antenna coil 40*a* to the key-side control circuit 23 via the key-side antenna coil 21*a*.

When the key-side control circuit 23 receives the power signal, it is activated and determines the contents of a command of the power signal. Then, when the control circuit 23 determines the command contents indicating, "transmit ID code", it reads out an ID code from the system area of the nonvolatile memory 26 and turns the transistor 28*a* of the modulation circuit 28 on or off based on the ID code, and simultaneously, transmits the ID code to the control circuit 34 at the side of the R/W device.

Figure 12A:
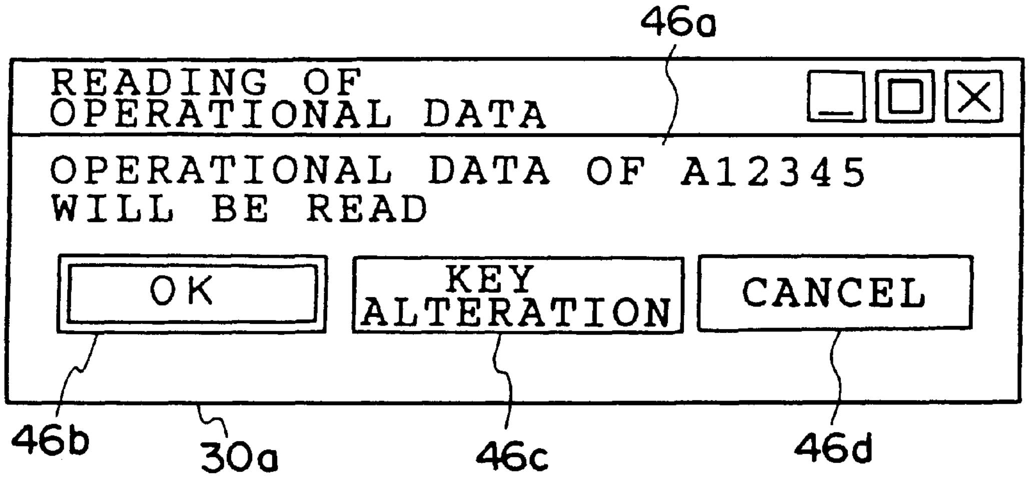
FIG. 12*a* and FIG. 12*b* are diagrams which each show an image surface of the personal computer.

When the control circuit 34 at the side of the R/W device receives the ID code, the control circuit 34 transmits the same to the personal computer 30. As a result, as shown in FIG. 12A, the personal computer 30 displays a confirmation message 46*a* which indicates, "operational data of A12345 (ID code) is read", an OK key 46*b*, a key alteration key 46*c*, and a cancel key 46*d*.

Here, when the cancel key 46*d* is clicked, the personal computer 30 cancels reading of operational data and returns the image surface to a previous state. Further, when the key alteration key 46*c* is clicked, the personal computer 30 gives a command signal which indicates, "read ID code", to the control circuit 34 at the side of the R/W device, repeats the above-described series of operations, and simultaneously, reads out an ID code of the key 19A newly inserted into the key insertion opening 38*a*, and rewrites the confirmation message 46*a* based on the read ID code.

Further, when the OK key 46*b* is clicked, the personal computer 30 gives a command signal which indicates, "read operational data", to the control circuit 34 at the side of the R/W device. As a result, the control circuit 34 at the side of the R/W device gives a power signal which indicates, "transmit operational data", to the key-side control circuit 23.

When the key-side control circuit 23 receives the power signal, the control circuit 23 is activated and determines the contents of a command of the power signal. Then, the control circuit 23 reads out operational data from the operational data area of the nonvolatile memory 26 and turns the transistor 28*a* of the modulation circuit 28 on or off based on the operational data. Simultaneously, the control circuit 23 transmits the operational data to the control circuit 23 at the side of the R/W device. As a result, the control circuit 23 at the side of the R/W device receives the operational data and transfers the same to the personal computer 30.

Figure 12B:
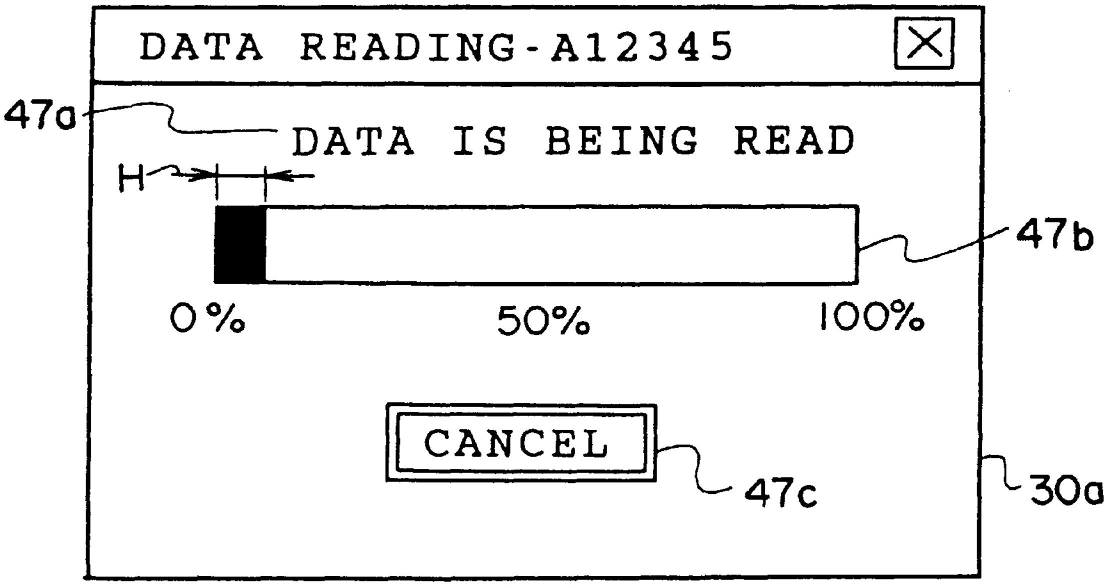

During communication of the operational data between the personal computer 30 and the control circuit 34 at the side of the R/W device, as shown in FIG. 12*b*, the personal computer 30 displays a confirmation message 47*a* which indicates, "data is being read", a graph 47*b*, and a cancel key 47*c*, and also indicates the progress of the communication by varying a longitudinal dimension H of the graph 47*b*. Meanwhile, in FIG. 12A, when the cancel key 46*d* is clicked, the personal computer 30 stops reading the operational data and returns the image surface to the state shown in FIG. 11*b*.

Figure 13:
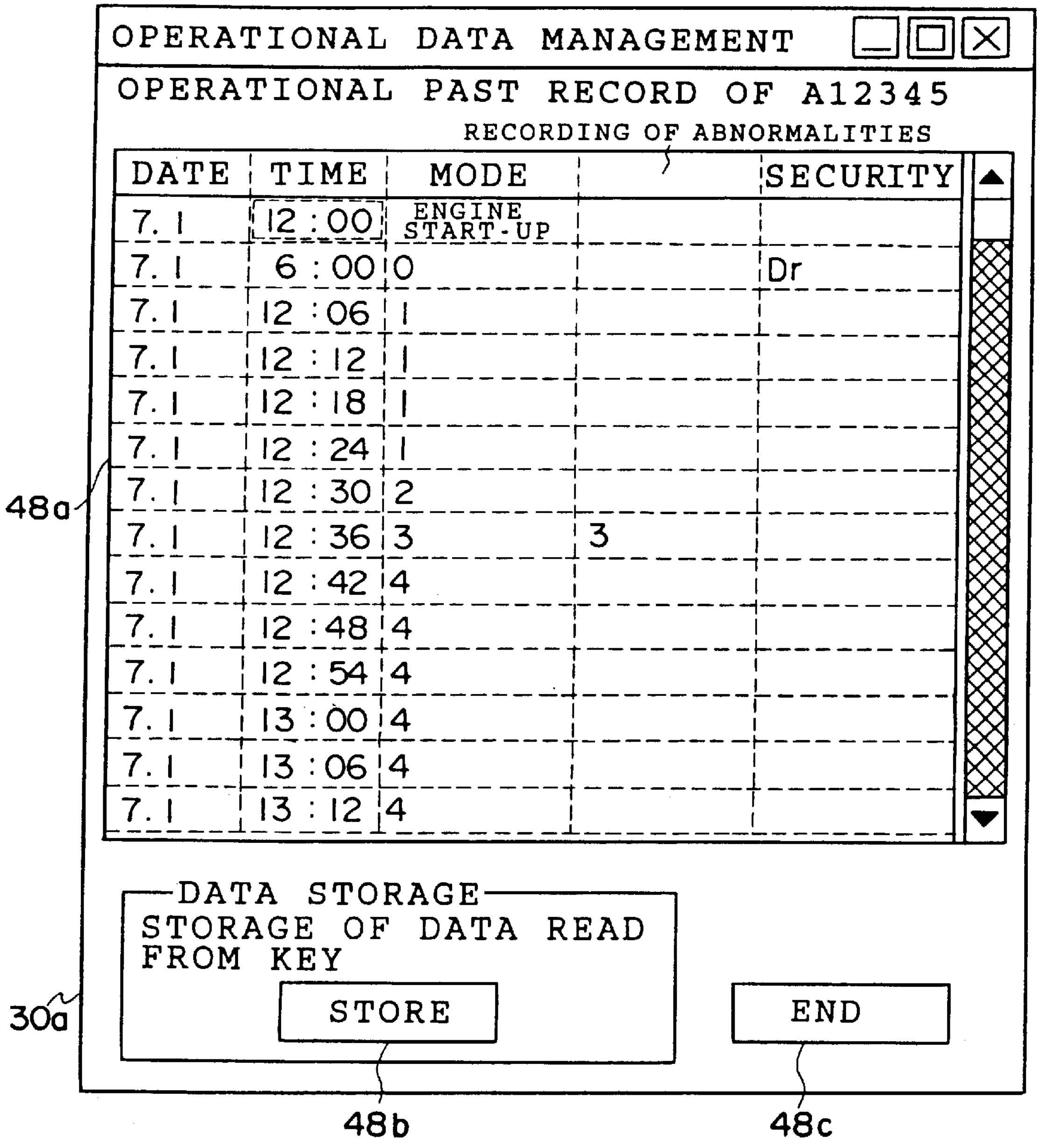
FIG. 13 is a diagram which shows an image surface of the personal computer.

When the communication of the operational data has been completed, as shown in FIG. 13, the personal computer 30 displays operational data 48*a*, a storage key 48*b*, and a termination key 48*c*. Here, when the termination key 48*c* is clicked, processing ends. The operational data is comprised of the date, time, operating mode, recording of abnormalities, and security, and indicates, "the engine was started at 12:00 on July 1", "an operation of the mode 1 was effected from 12:06 to 12:24 on July 1 (the contents of the operation per unit of time)", and the like.

Figure 14A:
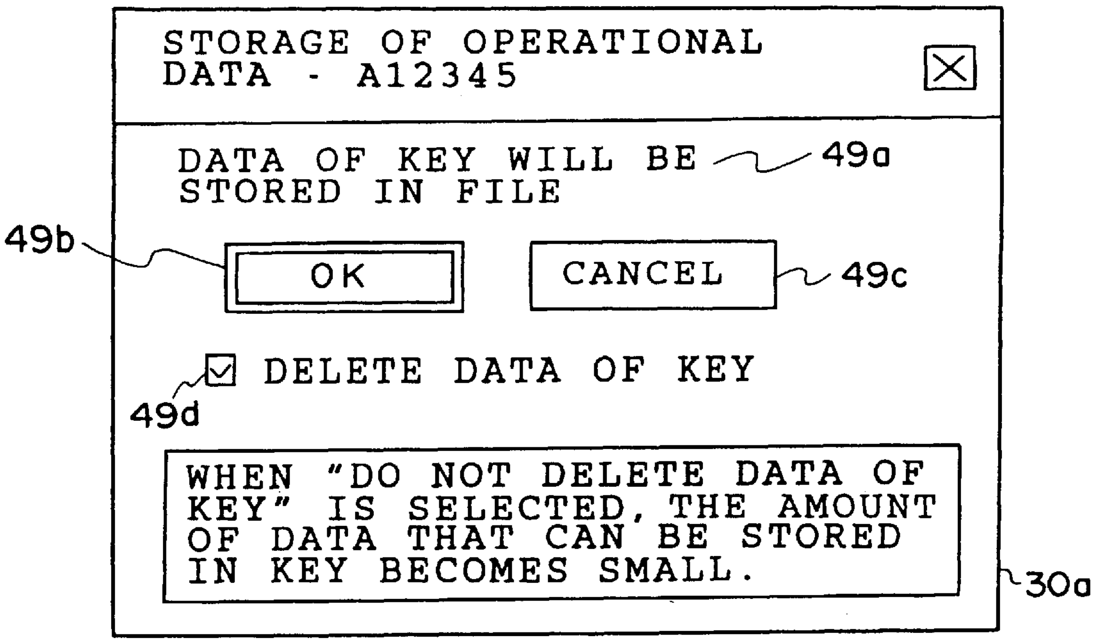
FIG. 14*a* and FIG. 14*b* are diagrams which each show an image surface of the personal computer.

Further, when the storage key 48*b* is clicked in FIG. 13, the personal computer 30 displays a message which indicates, "data of a key is stored in a file", an OK key 49*b*, a cancel key 49*c*, and a check boss 49*d*, as shown in FIG. 14A.

Here, when the check boss 49*d* and the OK key 49*b* are sequentially clicked, the personal computer 30 writes the operational data 48*a* in an external storage medium 30*c* (a floppy disk or a hard disk) shown in FIG. 1 so as to correspond to an ID code. Simultaneously, the personal computer 30 gives a command signal which indicates, "give a command to clear the operational data", to the control circuit 34 at the side of the R/W device. As a result, the control circuit 34 at the side of the R/W device gives to the key-side control circuit 23 a command signal which indicates, "clear the operational data", so that the key-side control circuit 23 clears (initializes) the operational data written in the operational data area of the nonvolatile memory 26.

Further, in FIG. 14A, when the OK key 49*b* is directly clicked, the personal computer 30 writes the operational data 48*a* in the external storage medium 30*c* without clearing the operational data of the nonvolatile memory 26 at the side of the key. Meanwhile, when the cancel key 49*c* is clicked, the personal computer 30 returns the image surface to a previous state.

Figure 14B:
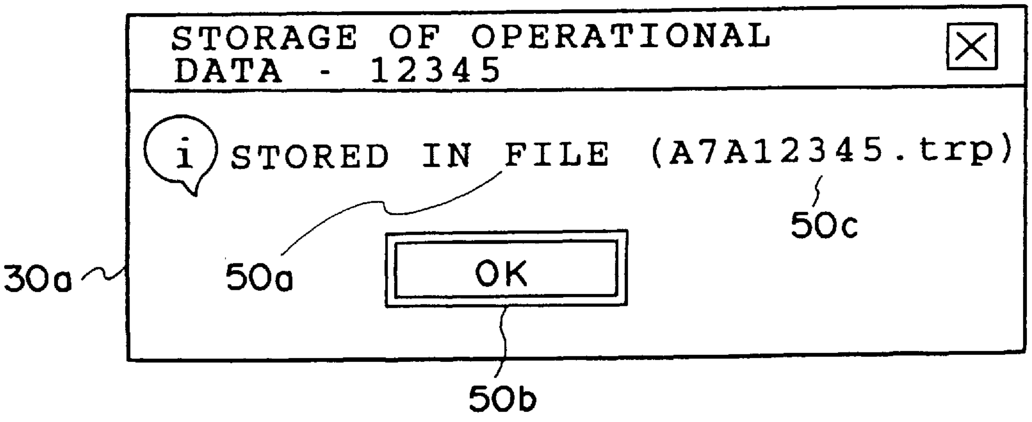

When the operational data 48*a* is stored in the external storage medium 30*c*, as shown in FIG. 14*b*, the personal computer 30 displays a message 50*a* which indicates, "data has been stored in a file", an OK key 50*b*, and a file title 50*c*. Here, when the OK key 50*b* is clicked, processing ends. The file title 50*c* is prepared by the personal computer 30. "A" represents the dominical year (for example, the year 1996, 1997 . . . , 2021 are indicated by A, B . . . , Z, respectively), "2" represents the month, and "A12345" is an ID code of the key.

[Accumulation processing function of operational data]

Figure 15:
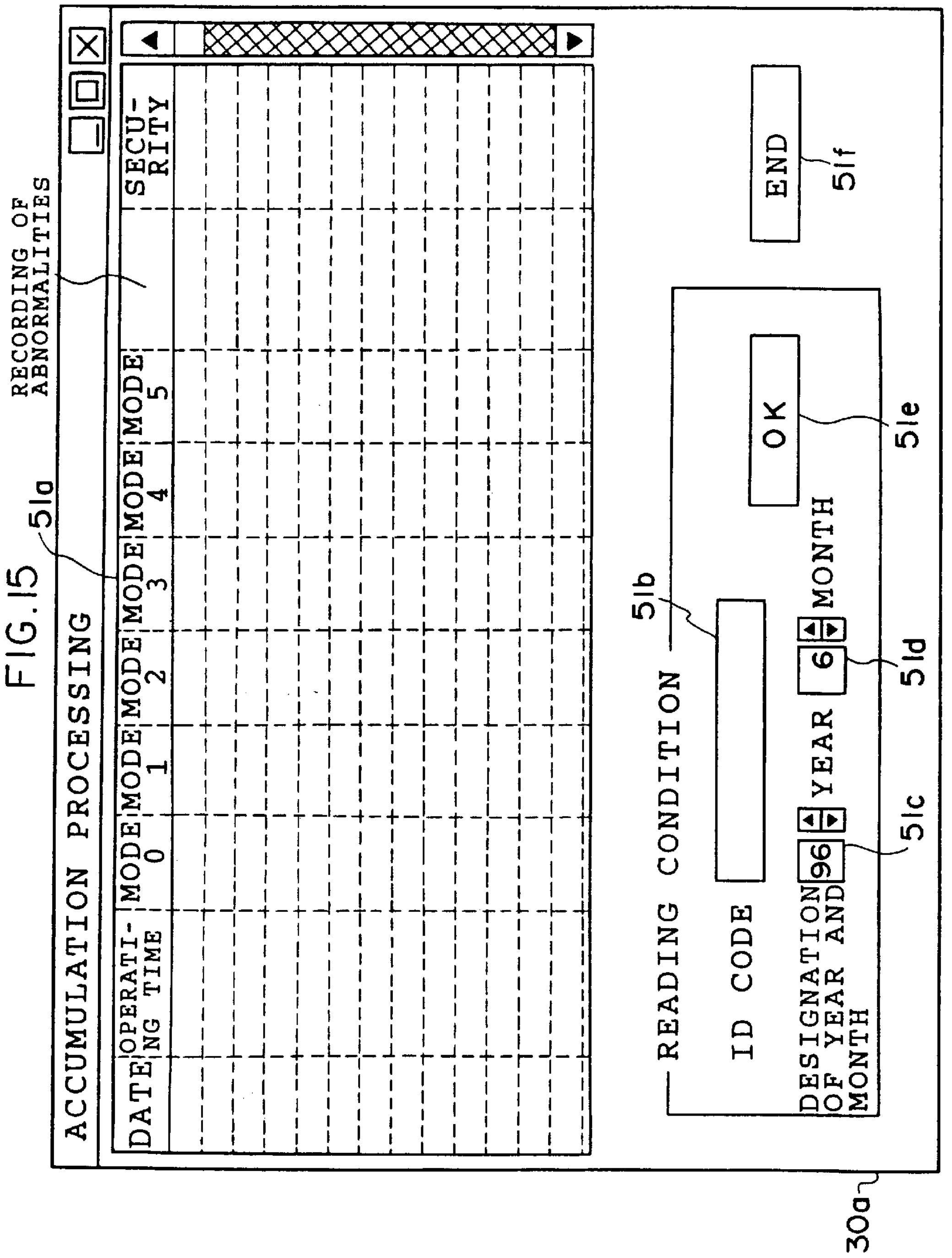
FIG. 15 is a diagram which shows an image surface of the personal computer.

In FIG. 11*b*, when the accumulation processing key 45*b* is clicked, the personal computer 30 displays an accumulation processing list 51*a*, an ID code input portion 51*b*, a year input portion 51*c*, a month input portion 51*d*, an OK key 51*e*, and a termination key 51*f*, which are shown in FIG. 15. Here, when the termination key 51*f* is clicked, processing ends.

Figure 16:
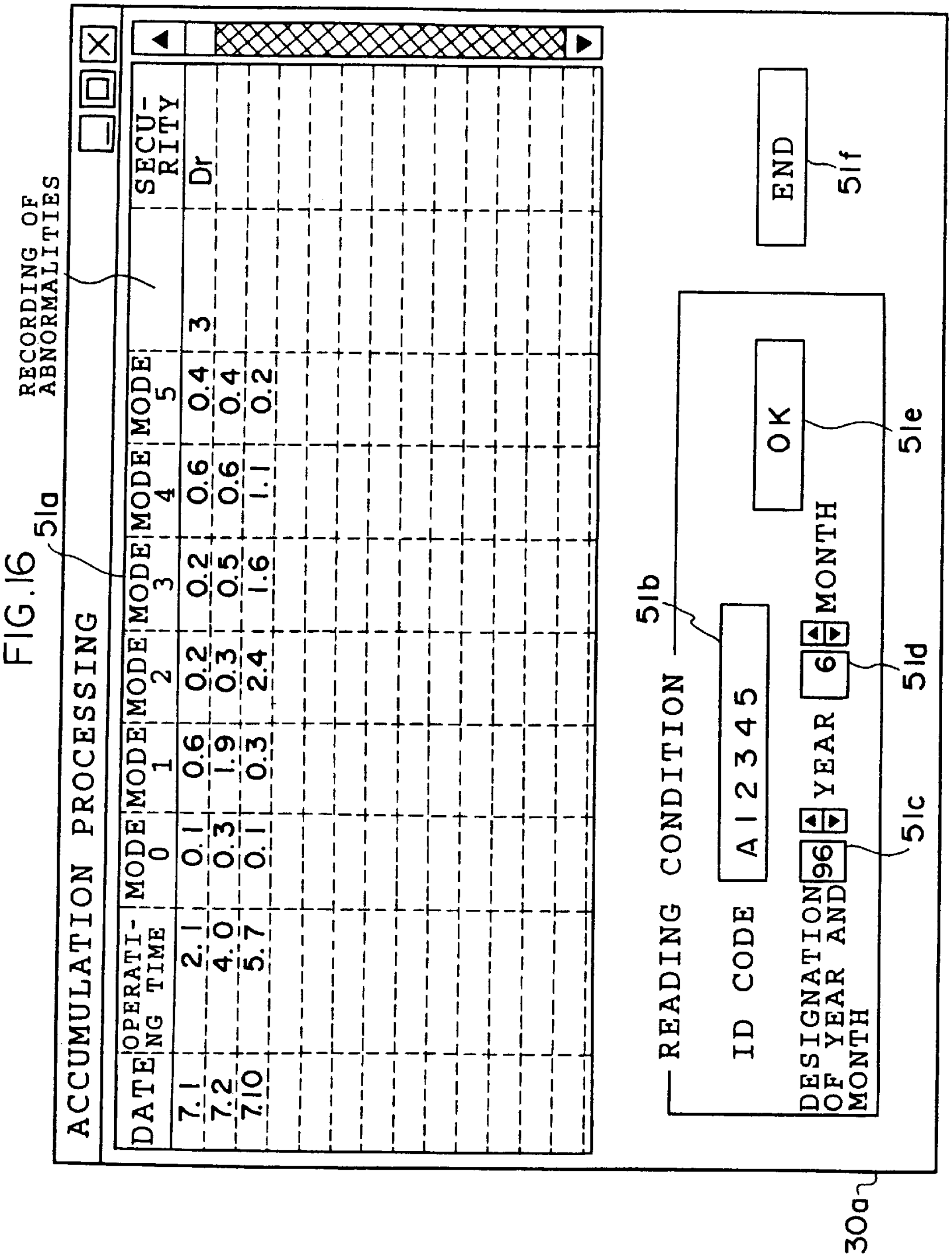
FIG. 16 is a diagram which shows an image surface of the personal computer.

Further, after the ID code, the year, and the month are respectively inputted to the ID code input portion 51*b*, the year input portion 51*c*, and the month input portion 51*d*, when the OK key 51*e* is clicked, the personal computer 30 reads out the operational data corresponding to the inputted ID code, year, and month from the external storage medium 30*c*. Then, the personal computer 30 processes the operational data based on an accumulation processing program and accumulates operational data for each key (each ID code), for each month, and for each contents of operation, and further, as shown in FIG. 16, the personal computer 30 writes a processing result in a predetermined section of the accumulation processing list 51*a*. Meanwhile, this accumulation processing is effected by the personal computer 30 alone, and the R/W device 31 does not need to be connected thereto.

[Key information reading function]

In FIG. 11A, when the key information setting key 44*b* is clicked, the personal computer 30 gives a command signal which indicates, "read key information", to the control circuit 34 at the side of the R/W device. As a result, the control circuit 34 at the side of the R/W device transmits a command signal which indicates, "send key information", to the key-side control circuit 23.

Figure 17:
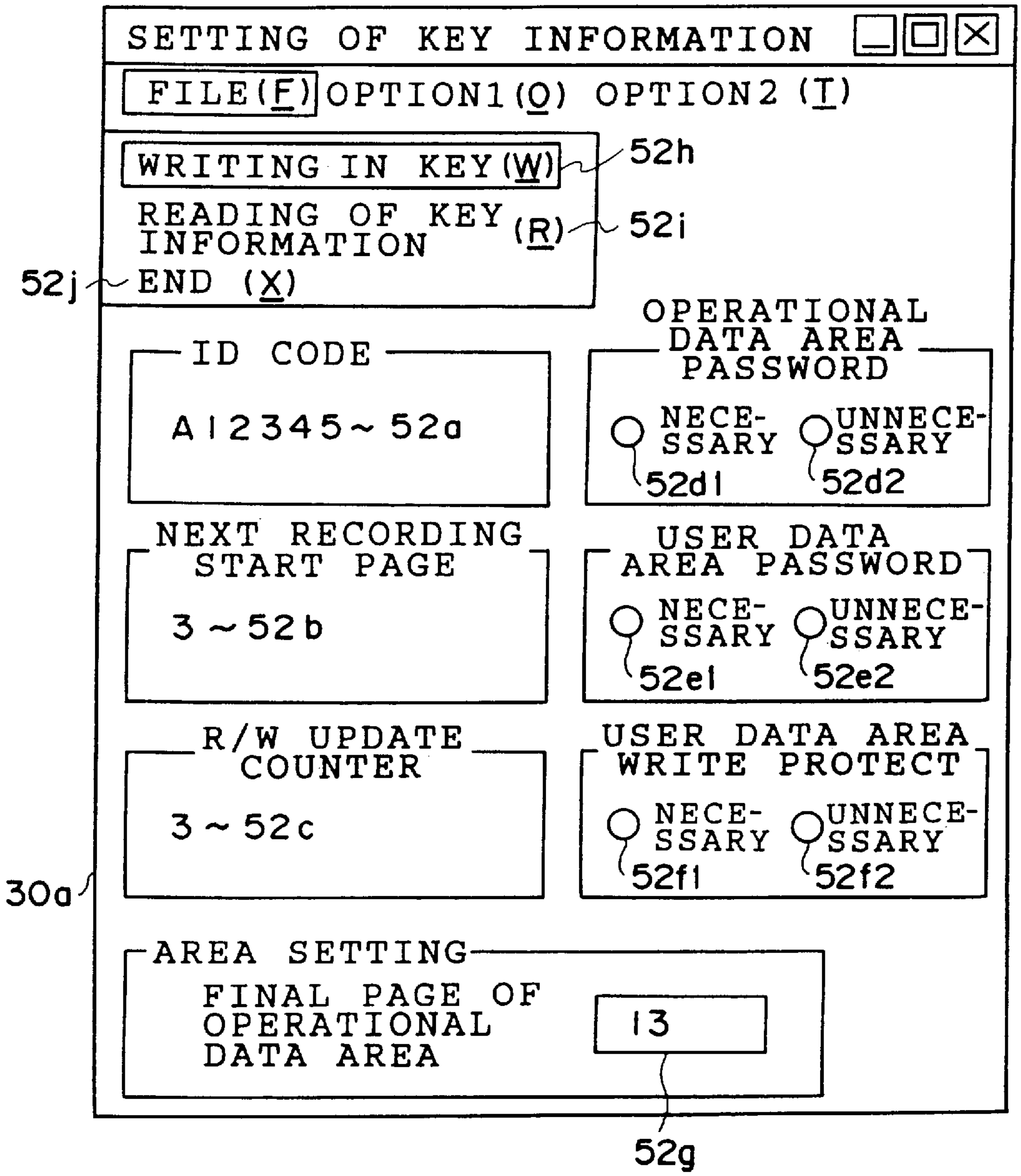
FIG. 17 is a diagram which shows an image surface of the personal computer.

When the key-side control circuit 23 receives the command signal, the control circuit 23 is activated to read out key information from the system area of the nonvolatile memory 26, and also transmits the same to the personal computer 30 via the control circuit 34 at the side of the R/W device. As a result, as shown in FIG. 17, the personal computer 30 displays, as the key information, an ID code 52*a*, a next-time recording start page 52*b*, and an R/W update counter 52*c*. Simultaneously, the personal computer 30 displays check bosses 52*d*1 to 52*f*2, a final page input portion 52*g*, a key-writing key 52*h*, a key information reading key 52*i*, and a termination key 52*j*.

The next-time recording start page indicates a reading start page of operational data for the key-side nonvolatile memory 26. When the next-time recording start page is page 3, the R/W device effects reading and writing the operational data with page 3 set as the start page. Further, the final page input portion 52*g* is used to change a boundary between the operational data area and the user data area. In FIG. 7, the boundary is page 13. Further, the R/W update counter shown in FIG. 17 is used for an addition when operational data is read out from the key 19A and is deleted, and indicates a past history of initialization.

[Key information alteration function 1]

Figure 18:
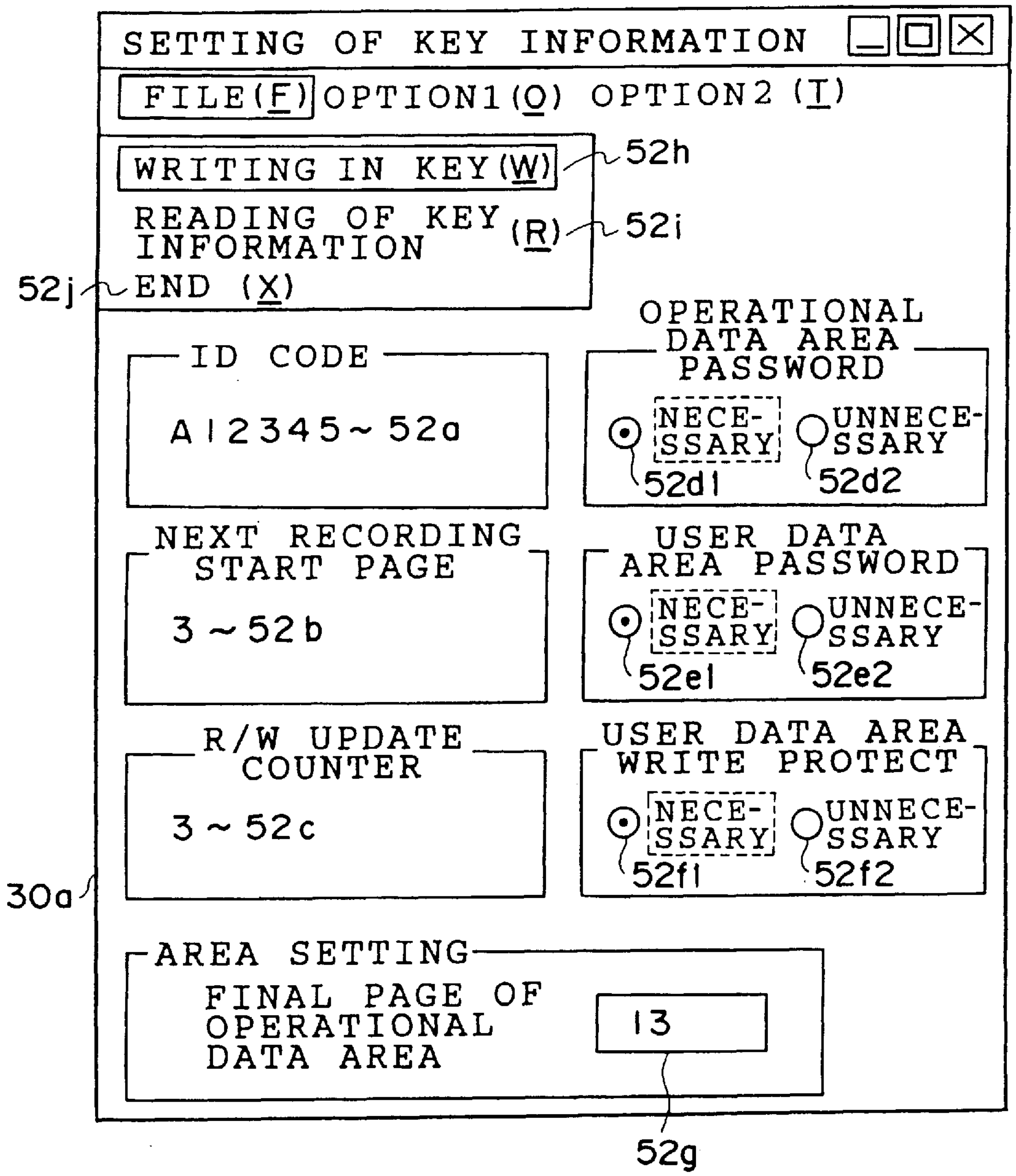
FIG. 18 is a diagram which shows an image surface of the personal computer.

The check bosses 52*d*1 and 52*d*2 shown in FIG. 17 are used to select whether a password is used in reading operational data from the operational data area of the nonvolatile memory 26. When the password is used, the check boss 52*d*1 is clicked, and as shown in FIG. 18, the operational data area password is switched to being necessary, and thereafter, the key-writing key 52*h* is clicked.

The check bosses 52*e*1 and 52*e*2 shown in FIG. 17 are used to select whether a password is used in reading user data from the user data area of the nonvolatile memory 26. When the password is used, the check boss 52*e*1 is clicked, and as shown in FIG. 18, the user data area password is switched to being, necessary, and thereafter, the key-writing key 52*h* is clicked.

Further, the check bosses 52*f*1 and 52*f*2 shown in FIG. 17 are used to select whether the user data area is set in a rewriting-allowable state. When the user data area is set in a rewriting-impossible state, the check boss 52*f*1 is clicked, and as shown in FIG. 18, the user data area write protect is switched to being necessary, and thereafter, the key-writing key 52*h* is clicked.

Figure 19A:
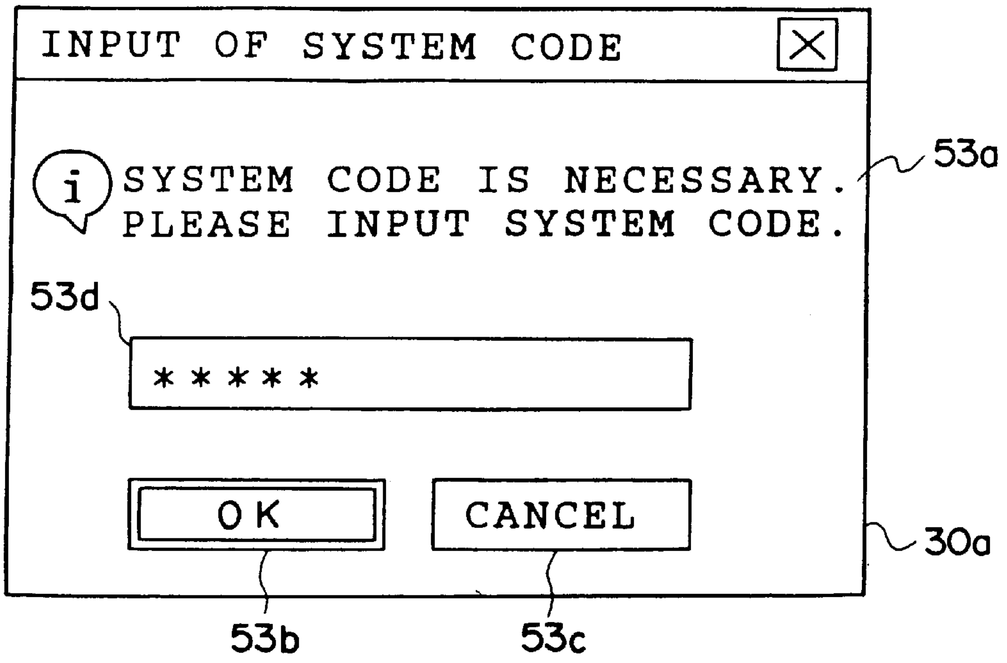
FIG. 19A and 19B are diagrams which each show an image surface of the personal computer.

When the key-writing key 52*h* is clicked, as shown in FIG. 19A, the personal computer 30 displays a message 53*a* which indicates, "System code is needed. Input system code.", an OK key 53*b*, a cancel key 53*c*, and a system code input portion 53*d*. Here, when the cancel key 53*c* is clicked, the image surface is returned to a previous state.

Further, when the OK key 53*b* is clicked after a system code (six alphanumeric characters or less) has been inputted to the system code input portion 53*d*, the personal computer 30 gives a command to the key-side control circuit 23 via the control circuit 34 at the side of the R/W device. At the same time, the personal computer 30 switches the operating mode to a mode for reading operational data using a password, a mode for reading user data using a password, and a mode by which rewriting of the user data area is made impossible.

Figure 19B:
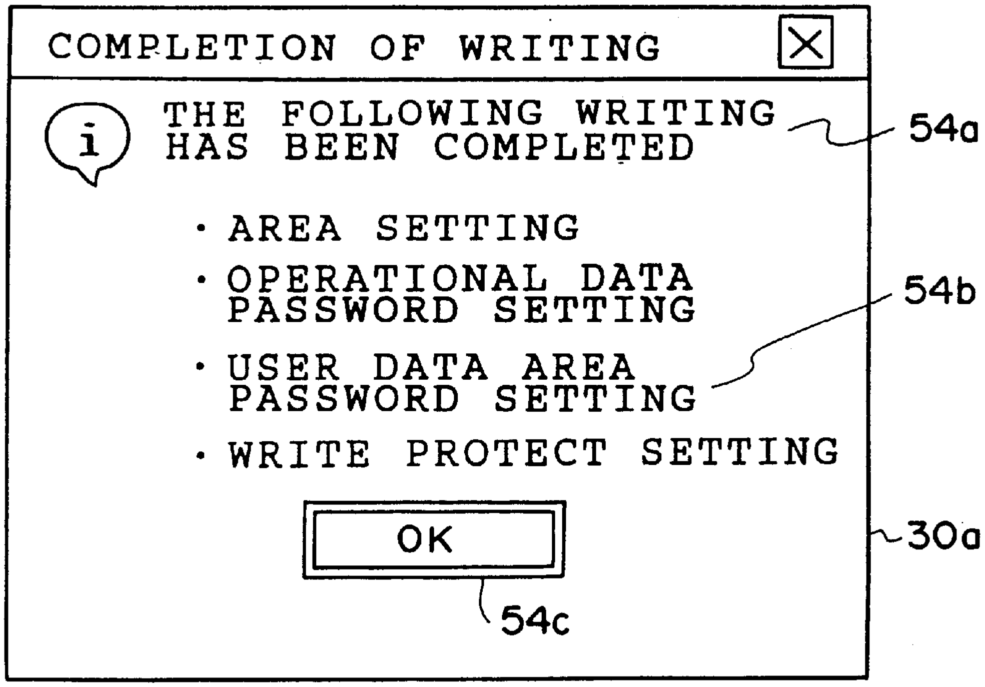

When the operating mode is switched, as shown in FIG. 19*b*, the personal computer 30 displays a message 54*a* which indicates, "the following writing has been completed", switching contents 54*b* of modes of "area setting, operational data password setting, user data area password setting, and writing protect setting", and an OK key 54_c_. Here, when the OK key 54_c_ is clicked, processing ends.

[Key information alteration function 2]

In FIG. 17, after an numeric character N (1 to 15) has been inputted into the final page input portion 52_g_, when the key-writing key 52_h_ is clicked, the personal computer 30 displays the message 53_a_, the OK key 53_b_, the cancel key 53_c_, and the system code input portion 53_d_, as will be shown in FIG. 19A.

Here, when the OK key 53_b_ is clicked after a system code has been inputted into the system code input portion 53_d_, the personal computer 30 gives a command to the key-side control circuit 23 via the control circuit 34 at the side of the R/W device, and at the same time, the personal computer 30 sets the input value N on the final page of the operational data area and sets an input value N+1 on the start page of the user data area, and as shown in FIG. 19_b_, the personal computer 30 displays the message 54_a_, the mode switching contents 54_b_, and the OK key 54_c_.

[Key information alteration function 3]

Figure 20:
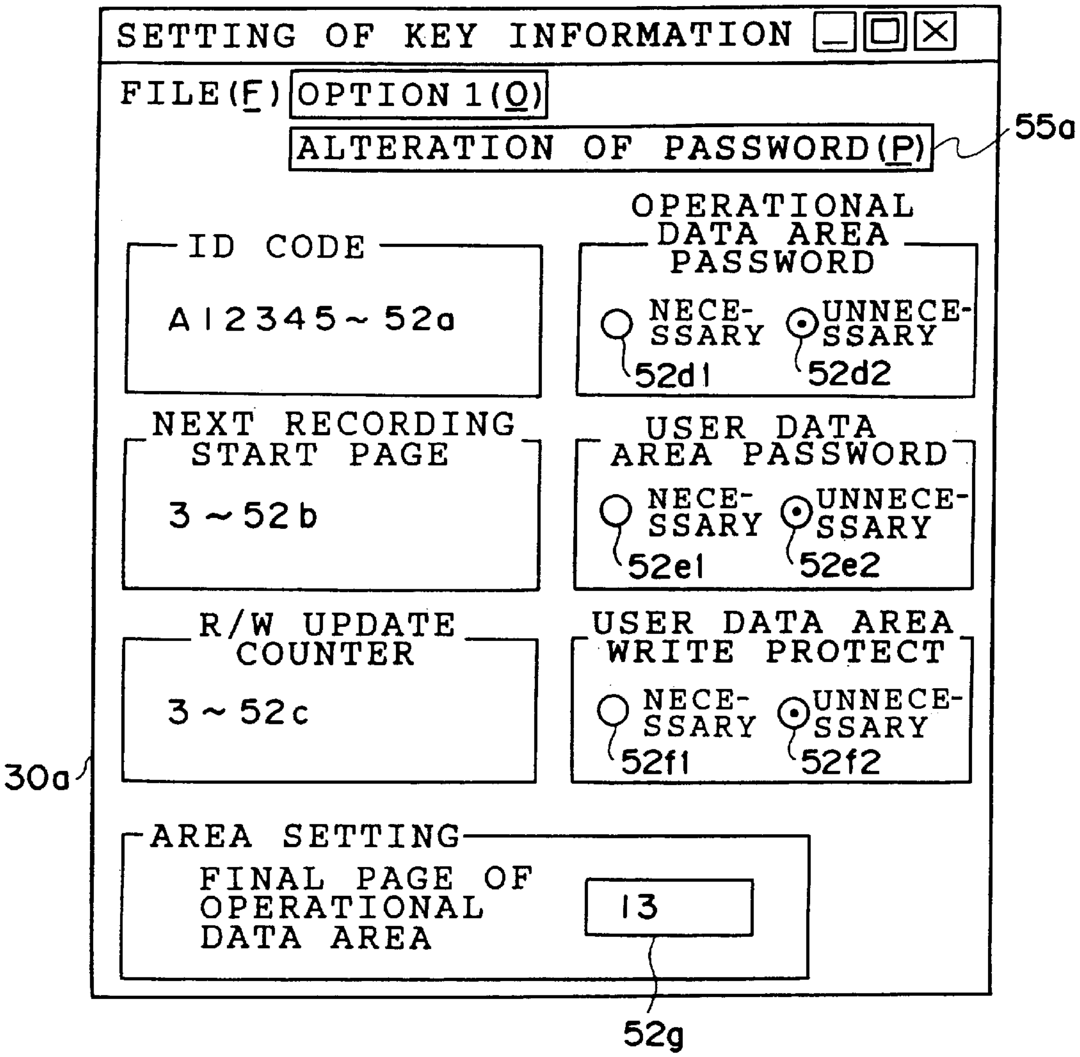
FIG. 20 is a diagram which shows an image surface of the personal computer.
Figure 21:
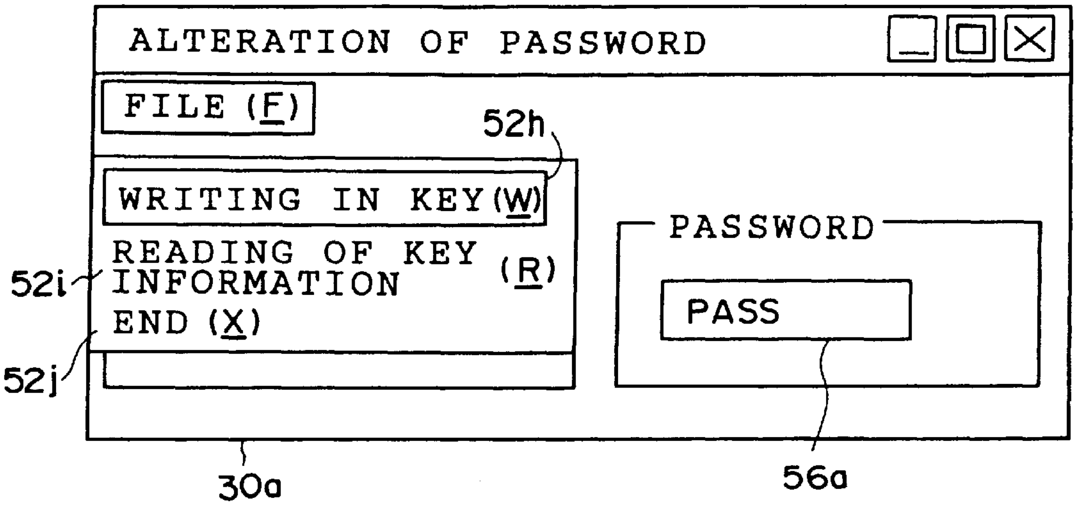
FIG. 21 is a diagram which shows an image surface of the personal computer.
Figure 22:
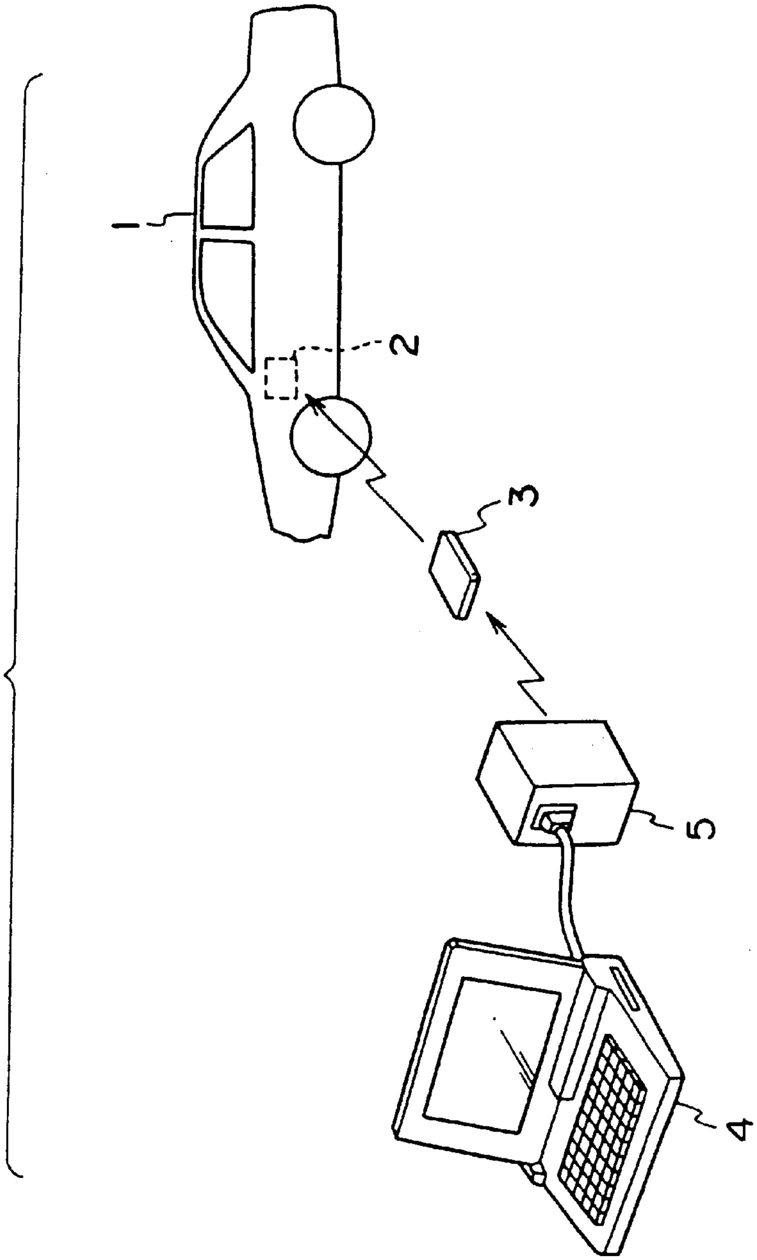
FIG. 22 is a diagram which shows a conventional example.

When a password alteration key 55_a_ is clicked in FIG. 20, as shown in FIG. 19A, the personal computer 30 displays the message 53_a_, the OK key 53_b_, the cancel key 53_c_, and the system code input portion 53_d_. When the OK key 53_b_ is clicked after a system code has been inputted to the system code input portion 53_d_, the personal computer 30 displays a password input portion 56_a_ and also displays a present password (PASS) in the input portion 56_a_, as shown in FIG. 21.

In the above-described state, when the key-writing key 52_h_ is clicked after an alteration password has been inputted to the password input portion 56_a_, as shown in FIG. 19A, the personal computer 30 displays the message 53_a_, the OK key 53_b_, the cancel key 53_c_, and the system code input portion 53_d_. Here, when the OK key 53_b_ is clicked after a system code has been inputted to the system code input portion 53_d_, the personal computer 30 gives a command to the key-side control circuit 23 via the control circuit 34 at the side of the R/W device and alters the password. Then, as shown in FIG. 19_b_, the personal computer 30 displays the message 54_a_, the mode switching contents 54_b_, and the OK key 54_c_.

[Key information alteration function 4]

With the key 19A being inserted in the key insertion opening 38_a_ of the R/W device 31, when the user data management key 44_c_ shown in FIG. 11A is clicked, the personal computer 30 reads out an ID code from the regular key 19A, and also displays the confirmation message 46_a_, the OK key 46_b_, the key alteration key 46_c_, and the cancel key 46_d_, as shown in FIG. 12A. Here, when the OK key 46_b_ is clicked, the personal computer 30 reads out user data from the user data area of the nonvolatile memory 26 of the key-side control circuit 23 via the control circuit 34 at the side of the R/W device, and also displays the same on the image surface.

Meanwhile, when the operating mode is switched to the mode for reading user data using a password, the personal computer 30 displays an image surface for inputting the password. Then, when the personal computer 30 detects that the password has been correctly inputted, it reads out the user data from the nonvolatile memory 26 and displays the same on the image surface.

Here, when user data (corresponding to user information) such as an ID code, an engine number, optional carrying data, maintenance data in a dealer, a past history of fueling, diagnosis data at the time of use, and the like are inputted to the personal computer 30, the personal computer 30 displays the message 53_a_, the OK key 53_b_, the cancel key 53_c_, and the system code input portion 53_d_, as shown in FIG. 19A.

Meanwhile, when the operating mode is switched to the mode by which rewriting of a user data area is made impossible, the personal computer 30 displays a message on the image surface and indicates that user data cannot be written.

In FIG. 19A, when the OK key 53_b_ is clicked after a system code has been inputted to the system code input portion 53_d_, the personal computer 30 writes user data in the user data area of the nonvolatile memory 26 via the control circuit 34 at the side of the R/W device or rewrites the user data, and thereafter, the personal computer 30 displays the message 54_a_, the mode switching contents 54_b_, and the OK key 54_c_, as shown in FIG. 19_b_.

According to the above-described embodiment, the communication of operational data is performed between the vehicle-side controller 12 and the R/W device 31 with the key 19A serving as a medium. For this reason, it is different from a conventional system in which communication of operational data is performed with an IC card serving as a medium, carrying both the key 19A and the IC card becomes unnecessary, and as a result, convenience for use improves. Particularly, in a case of a special vehicle such as the construction vehicle 11, the inconvenience of carrying both the key 19A and the IC card in a work site can be eliminated, and therefore, the present system is even more advantageous in terms of convenience for use.

Further, the present invention has been applied to a system having security functions (an immobilizer function, a door security function). For this reason, an existing hard structure may be used to allow communication of operational data. Moreover, it is possible to prevent start-up of the engine using an unregistered key and writing of operational data. Accordingly, the present system is advantageous even in terms of data security.

Moreover, user data is written in the key-side nonvolatile memory 26 via the personal computer 30 and the R/W device 31 or the user data is read out from the nonvolatile memory 26. For this reason, it becomes unnecessary to carry an IC card or a notebook having user data written therein, and therefore, convenience for use is further improved.

At the time of communication between the vehicle-side controller 12 and the transponder 20, operating power is applied from the vehicle-side controller 12 to the transponder 20 in a non-contacting state to allow recording of operational data. In addition, at the time of communication between the transponder 20 and the R/W device 31, operating power is applied from the R/W device 31 to the transponder 20 in a non-contacting state to allow reading of operational data. For this reason, it becomes unnecessary for a power source such as a battery to be contained in the key 19A. Accordingly, the key 19A is prevented from being made larger and complicatedness of battery replacement is eliminated.

The key detection switch 39 is provided in the R/W device 31, and based on an output signal from the key detection switch 39, the presence of the key 19A is detected. For this reason, it is possible to detect omission of insertion of the key 19A and to communicate an abnormal condition, thereby preventing omission of insertion of the key 19A.

Further, accumulation processing of operational data of the vehicle 11 is performed by the personal computer 30 (the accumulation processing function). For this reason, it becomes unnecessary to perform accumulation processing of an operational past record by hand, thereby resulting in improved convenience for use.

Moreover, the mode switches 18*a* to 18*e* are provided in the vehicle-side controller 12 and the operating mode is determined in accordance with the contents of operation of the mode switches 18*a* to 18*e*. For this reason, the operating time (operational data) can be measured for each operating mode, and therefore, convenience for use is further improved.

In the above-described embodiment, the key detection switch 39 provided in the R/W device 31 is used to detect whether the key 19A has been inserted in the key insertion opening 38*a*. However, the present invention is not limited to the same. For example, the key detection switch 39 does not need to be provided. In this case, the R/W device 31 cannot communicate with the transponder 20 even if it tries to communicate therewith. Accordingly, at this point in time, the absence of the key is detected and can be displayed on the image surface of the personal computer 30.

Further, in the above-described embodiment, the R/W device 31 is driven by an external power source (commercial alternating current power source), but the present invention is not limited to the same. For example, the R/W device 31 may also be driven by an internal power source such as a battery, built in the R/W device 31.

Moreover, in the above-described embodiment, the desk-top personal computer 30 is illustrated as an external controller, but the present invention is not limited to the same. For example, a portable notebook-sized personal computer, sub notebook-sized personal computer, or the like may also be used.

Still further, in the above-described embodiment, user data is written in the transponder 20 via the personal computer 30 and the R/W device 31, but the present invention is not limited to the same. For example, a user data writing function may be canceled. In a structure without a user data writing function, the R/W device 31 functions as a device used only as a reader for reading operational data from the transponder 20.

Moreover, in the above-described embodiment, the present invention is applied to the construction vehicle 1, but the present invention is not limited to the same. For example, the present invention may also be applied to an automobile. In this case, inputting of a secret identification code is effected in such a manner that the regular key 19A or the master key 19B is inserted in the ignition key cylinder and an operation set including the following operations (1) and (2) is carried out four times (sets).

(1) The key 19A or the key 19B is turned N times in the order of, (ACC)→ON→ACC.

(2) The key 19A or the key 19B is turned only once in the order of, (ACC)→OFF→ACC.

As clearly seen from the foregoing, the data carrier system of the present invention has the following effects.

According to means described in claim 1, communication of operational data is effected with a vehicle key serving as a medium. For this reason, it becomes unnecessary to carry an IC card, thereby resulting in improved convenience for use.

According to means described in claim 2, the present invention is applied to an existing system having security functions. For this reason, an existing hard structure may be utilized to allow communication of operational data. At the same time, it is possible to prevent the start-up of a vehicle and writing of operational data with an unregistered key, so that the system becomes advantageous even in terms of data security.

According to means described in claim 3, user data is transferred from a reading device to a data carrier device and is also recorded in the data carrier device, or the user data recorded in the data carrier device is read out. For this reason, it becomes unnecessary to carry an IC card or a notebook having user data recorded therein, and therefore, convenience for use is further improved.

According to means described in claim 4, operating power is supplied in a non-contacting state from a vehicle-side control device to the data carrier device and from the reading device to the data carrier device. For this reason, it becomes unnecessary to build a power source such as a battery into a key. Accordingly, the key is prevented from being made larger and complicatedness of battery replacement can be eliminated.

What is claimed is:

1. A data carrier system characterized by comprising:

a vehicle-side control device installed in a vehicle, which transmits operational information of the vehicle, the operational information indicating operational history of how the vehicle has been operated previously;

a data carrier device which is provided in a vehicle key and which records the operational information transmitted from the vehicle-side control device; and a reading device provided separately from the vehicle, which reads out the operational information from the data carrier device, accompanying supplying thereto of a command signal from an external control device, and which can conduct data processing on the read operational information.

2. A data carrier system according to claim 1, characterized in that the vehicle-side control device permits starting of the vehicle when it is determined that a key is that registered based on key information transmitted from the data carrier device.

3. A data carrier system according to claim 1, characterized in that the reading device has a read/write function in which user information is supplied to and recorded in the data carrier device and the user information is read from the data carrier device.

4. A data carrier system according to claim 1, characterized in that:

the vehicle-side control device, the data carrier device, and the reading device each have an antenna coil;

communication between the vehicle-side control device and the data carrier device and communication between the data carrier device and the reading device are each effected via the antenna coil in a non-contacting state;

when communication is effected between the vehicle-side control device and the data carrier device, operating power is supplied in a non-contacting state from the antenna coil of the vehicle-side control device to the data carrier device via the antenna coil of the data carrier device; and when communication is effected between the data carrier device and the reading device, operating power is supplied in a non-contacting state from the antenna coil of the reading device to the data carrier device via the antenna coil of the data carrier device.

5. A data carrier system according to claim 1, characterized in that the operational information includes at least day, time, and operational mode data.

6. A data carrier system according to claim 1, characterized in that the data carrier device records user information in addition to the operational information.

7. A data carrier system according to claim 1, characterized in that the reading device, in addition to a read-out function for the operational information, has an accumulation processing function for the read operational information, a storage function for the accumulated information and a deletion function for the operational information.

8. A data carrier system according to claim 6, characterized in that the user information includes an ID code, a security function of the vehicle being released on a basis of the ID code.

9. A data carrier system according to claim 6, characterized in that the user information includes an ID code and data proper to the vehicle.

10. A data carrier system according to claim 6, characterized in that the user information includes an ID code, the ID code being used as a basis when releasing a security function of the vehicle and to distinguish the vehicle key with the reading device.

* * * * *